(12) United States Patent
Kim et al.

(10) Patent No.: US 7,952,548 B2
(45) Date of Patent: May 31, 2011

(54) ELECTRONIC DISPLAY DEVICE

(75) Inventors: Beom-Shik Kim, Yongin-si (KR); Hui Nam, Yongin-si (KR); Chan-Young Park, Yongin-si (KR); Ja-Seung Ku, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 906 days.

(21) Appl. No.: 11/863,158

(22) Filed: Sep. 27, 2007

(65) Prior Publication Data

US 2008/0218459 A1 Sep. 11, 2008

(30) Foreign Application Priority Data

Mar. 9, 2007 (KR) .................. 10-2007-0023510
Apr. 17, 2007 (KR) .................. 10-2007-0037407

(51) Int. Cl.
*G09G 3/36* (2006.01)

(52) U.S. Cl. .......................................... 345/87; 345/95

(58) Field of Classification Search ............ 345/87–102, 345/204; 313/414, 441, 446; 349/139–148
See application file for complete search history.

(56) References Cited

U.S. PATENT DOCUMENTS

| | | | | |
|---|---|---|---|---|
| 7,683,875 B2 * | 3/2010 | Kubo | .............. | 345/100 |
| 7,714,821 B2 * | 5/2010 | Seen | ............... | 345/87 |
| 7,728,801 B2 * | 6/2010 | Tsai et al. | ........ | 345/87 |
| 7,800,570 B2 * | 9/2010 | Jin et al. | .......... | 345/94 |
| 7,830,345 B2 * | 11/2010 | Yoshida et al. | ........ | 345/88 |
| 2004/0207594 A1 * | 10/2004 | Kubo | .............. | 345/100 |
| 2004/0222960 A1 * | 11/2004 | Suzuki et al. | ........ | 345/98 |
| 2005/0052399 A1 * | 3/2005 | Hattori et al. | ........ | 345/99 |
| 2005/0140622 A1 * | 6/2005 | Lee et al. | ........ | 345/88 |
| 2005/0184939 A1 * | 8/2005 | Ueda et al. | ........ | 345/87 |
| 2007/0152930 A1 * | 7/2007 | Jin et al. | .......... | 345/87 |
| 2007/0176872 A1 * | 8/2007 | Kazuyoshi et al. | ....... | 345/90 |

(Continued)

FOREIGN PATENT DOCUMENTS

JP 06-059287 3/1994

(Continued)

OTHER PUBLICATIONS

Patent Abstracts of Japan for Publication No. 06-059287; dated Mar. 4, 1994 in the name of Kazuyuki Haruhara, et al.
Patent Abstracts of Japan for Publication No. 2004-354407; dated Dec. 16, 2004 in the name of Kenji Okishiro, et al.

(Continued)

*Primary Examiner* — Nitin Patel

(74) *Attorney, Agent, or Firm* — Christie, Parker & Hale, LLP

(57) ABSTRACT

An electronic display device having viewing-angle adjusting and stereoscopic-image displaying functions. The display device includes a display unit for displaying an image and a liquid crystal barrier disposed in front of the display unit. The barrier includes: first and second substrates facing each other; a liquid crystal layer disposed between the first and second substrates; and a first controller for controlling light transmission, the first controller being disposed at the first substrate facing the liquid crystal layer and including first electrodes spaced apart from each other by an interval along a first direction of the liquid crystal barrier, second electrodes arranged between the first electrodes along the first direction, and a third electrode insulated from the first and second electrodes; and a second controller for adjusting a viewing angle, the second controller being disposed at the second substrate facing the liquid crystal layer and including one or more electrodes.

21 Claims, 26 Drawing Sheets

U.S. PATENT DOCUMENTS

| | | | |
|---|---|---|---|
| 2007/0195042 A1* | 8/2007 | Mos | 345/90 |
| 2007/0273625 A1* | 11/2007 | Cheng | 345/87 |
| 2007/0290974 A1* | 12/2007 | Huang et al. | 345/92 |
| 2008/0170023 A1* | 7/2008 | Choi et al. | 345/96 |

FOREIGN PATENT DOCUMENTS

| | | |
|---|---|---|
| JP | 2004-354407 | 12/2004 |
| KR | 10-2000-0060543 | 10/2000 |
| KR | 10-0477638 B1 | 3/2003 |
| KR | 10-0539638 B1 | 12/2005 |
| KR | 10-2006-0097175 | 9/2006 |
| KR | 10-2006-0124849 A | 12/2006 |
| KR | 10-2007-0023100 | 2/2007 |
| KR | 10-0684715 B1 | 2/2007 |
| KR | 10-0707609 | 4/2007 |
| KR | 10-0732834 | 6/2007 |

OTHER PUBLICATIONS

Korean Patent Abstracts for Publication No. 1020000060543; dated Oct. 16, 2000 in the name of Jang Geun Song.

Korean Patent Abstracts for Publication No. 1020060097175; dated Sep. 14, 2006 in the name of Hui Nam, et al.

Korean Patent Abstracts for Publication No. 100707609; dated Apr. 6, 2007 in the name of Kyung Ho Choi, et al.

Korean Patent Abstracts, Publication No. 10-2005-0002236 A, dated Jan. 7, 2005, in the name of Hee Jin Choi et al. corresponding to Korean Patent 10-0539638 B1 listed above.

Korean Patent Abstracts, Publicaiton No. 1020070023100 A, dated Feb. 28, 2007, in the name of Beom Shik Kim et al.

Korean Patent Abstracts, Publication No. 100732834 B1, dated Jun. 20, 2007, in the name of Kyung Ho Choi.

* cited by examiner

FIRST AND SECOND ELECTRODES: V1
THIRD ELECTRODE: V2

THIRD ELECTRODE: V4
FOURTH ELECTRODE: V5

ELECTRONIC DISPLAY DEVICE

CROSS-REFERENCES TO RELATED APPLICATIONS

This application claims priority to and the benefit of Korean Patent Application No. 10-2007-0023510 filed in the Korean Intellectual Property Office on Mar. 9, 2007, and No. 10-2007-0037407 filed in the Korean Intellectual Property Office on Apr. 17, 2007, the entire contents of which are incorporated herein by reference.

BACKGROUND OF THE INVENTION

1. Field of the Invention

The present invention relates to an electronic display device and, more particularly, to an electronic display device capable of displaying a stereoscopic image.

2. Description of the Related Art

In general, a viewing angle of an electronic display device is used as one factor for evaluating a display quality of the electronic display device. When the viewing angle is widened, a wider area of a screen of the electronic display device can be displayed and observed.

However, when personal information or privacy information is displayed on the screen of the electronic display device, the information may be revealed to other persons. Therefore, in this case, the wide viewing angle is unfavorable to a user of the electronic display device. Accordingly, there is a need for the electronic display device to have a function of selectively adjusting the viewing angle.

In addition, an electronic display device including a liquid crystal barrier disposed in front of a display unit capable of selectively displaying a two-dimensional (2-D) image and a three-dimensional (3-D) image has been developed. In the 2-D mode, the liquid crystal barrier becomes in a completely transmissive state, so that an image displayed by the display unit is completely transmitted through the screen.

In the 3-D mode, the display unit separately displays left-eye and right-eye images in units of pixels or sub-pixels, so that the liquid crystal barrier optically generates light transmitting portions and light blocking portions. The left-eye and right-eye images are directed to the left and right eyes of an observer by the liquid crystal barrier, so that the observer can see a stereoscopic image from the images displayed by the display unit (or display region).

Conventionally, in the field of the electronic display device, the electronic display device capable of adjusting the viewing angle and the electronic display device capable of displaying the stereoscopic image have been individually and/or separately developed.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of an embodiment of the present invention is directed to an electronic display device having a viewing angle adjusting function and a stereoscopic image displaying function.

According to an embodiment of the present invention, an electronic display device is provided. The electronic display device includes a display unit for displaying an image and a liquid crystal barrier disposed in front of the display unit. The liquid crystal barrier includes: a first substrate and a second substrate facing the first substrate; a liquid crystal layer disposed between the first and second substrates; a first controller for controlling light transmission, wherein the first controller is disposed at a side of the first substrate facing the liquid crystal layer and includes a plurality of first electrodes spaced apart from each other by an interval along a first direction of the liquid crystal barrier, a plurality of second electrodes arranged between the first electrodes along the first direction, and a third electrode insulated from the first and second electrodes; and a second controller for adjusting a viewing angle, wherein the second controller is disposed at a side of the second substrate facing the liquid crystal layer and includes at least one electrode.

In one embodiment, the electronic display device further includes an insulating layer, wherein the third electrode is disposed over an entire active area of the first substrate, and the third electrode is disposed at a plane of the liquid crystal barrier different from that of the first electrodes and the second electrodes with the insulating layer interposed between the third electrode and the first and second electrodes. The third electrode may be disposed to be closer to the first substrate than the first and second electrodes are disposed to the first substrate, and a thickness of the insulating layer may be smaller than that of the liquid crystal layer. The first controller may further include a first connection electrode coupled to one-side ends of the first electrodes, so that the first connection electrode and the first electrodes constitute a first electrode set, and a second connection electrode coupled to one-side ends of the second electrodes, so that the second connection electrode and the second electrodes constitute a second electrode set. Each of the first and second electrodes may have an opening configured to extend in a longitudinal direction thereof.

In one embodiment, the third electrode is disposed at a same plane of the liquid crystal barrier as that of the first electrodes and the second electrodes and between the first electrodes and the second electrodes. The first controller may further include a first connection electrode coupled to one-side ends of the first electrodes, so that the first connection electrode and the first electrodes constitute a first electrode set, and a second connection electrode coupled to one-side ends of the second electrodes, so that the second connection electrode and the second electrodes constitute a second electrode set. Each of the first electrodes may have a first opening exposed to the second connection electrode, each of the second electrodes may have a second opening exposed to the first connection electrode, and the third electrode may include extensions extending into the first openings and the second openings.

In one embodiment, the at least one electrode of the second controller includes a fourth electrode formed over an entire active area of the second substrate.

In one embodiment, the at least one electrode of the second controller includes a plurality of fourth electrodes spaced apart from each other by an interval along the first direction. The at least one electrode of the second controller may further include a plurality of fourth connection electrodes coupled to both-side ends of the fourth electrodes, so that the fourth connection electrodes and the fourth electrodes constitute a fourth electrode set.

In one embodiment, the at least one electrode of the second controller includes a plurality of fourth electrodes spaced apart from each other by an interval along a second direction perpendicular to the first direction. The at least one electrode of the second controller may further include a plurality of fourth connection electrodes coupled to both-side ends of the fourth electrodes, so that the fourth connection electrodes and the fourth electrodes constitute a fourth electrode set.

In one embodiment, the at least one electrode of the second controller includes a plurality of fourth electrodes spaced apart from each other by an interval along the first direction and a plurality of fifth electrodes insulated from the fourth electrodes by an insulating layer and spaced apart from each other by an interval along a second direction perpendicular to the first direction. The at least one electrode of the second controller may further include a plurality of fifth connection electrodes coupled to both-side ends of the fifth electrodes, so that the fifth connection electrodes and the fifth electrodes constitute a fifth electrode set, and a plurality of sixth connection electrodes coupled to both-side ends of the sixth electrodes, so that the sixth connection electrodes and the sixth electrodes constitute a sixth electrode set.

In one embodiment, the at least one electrode of the second controller includes a plurality of fourth electrodes disposed in parallel to each other to extend in the first direction and also a second direction perpendicular to the first direction with an interval therebetween, and a plurality of wire lines electrically connected to the fourth electrodes.

In one embodiment, the first direction is aligned with a horizontal direction of the display unit seen by an observer, and the display unit together with the liquid crystal barrier are adapted to selectively implement a first mode and a second mode, wherein the first mode is implemented when the display unit together with the liquid crystal barrier is maintained at a first position and the second mode is implemented when the display unit together with the liquid crystal barrier is rotated from the first position to a second position differing from the first position.

DETAILED DESCRIPTION OF THE EMBODIMENTS

Figure 1:
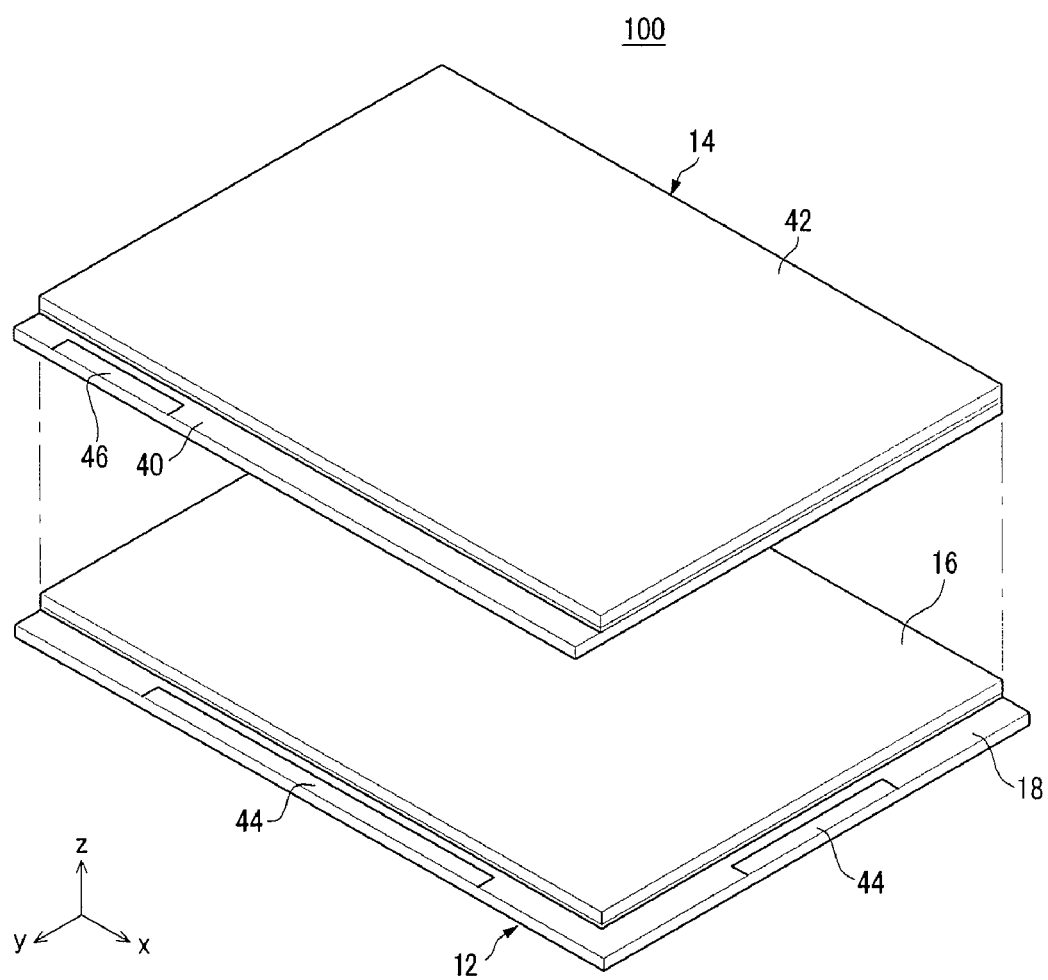
FIG. 1 is a schematic exploded perspective view showing an electronic display device according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic exploded perspective view showing an electronic display device according to an embodiment of the present invention.

Referring to FIG. 1, the electronic display device 100 according to the embodiment includes a display unit 12 for displaying an image and a liquid crystal barrier 14 disposed in front of the display unit (or display region) 12. The display unit 12 includes a plurality of pixels including red, green, and blue sub-pixels to display a color image.

The display unit 12 is applied with a 2-D image signal to display a 2-D image. Alternatively, the display unit 12 is applied with left-eye and right-eye image signals in units of pixels or sub-pixels to separately display a left-eye image and a right-eye image. The image signals are controlled by an image signal controller.

The display unit 12 can be used for any suitable display devices. For example, the display unit 12 may be constructed with an organic light emitting display panel, a liquid crystal display panel, a cathode ray tube, or a plasma display panel (PDP). In FIG. 1, the display unit 12 is a flat display unit including a front substrate 16 and a rear substrate 18. However, the display unit 12 is not limited to the flat display unit.

Figure 2:
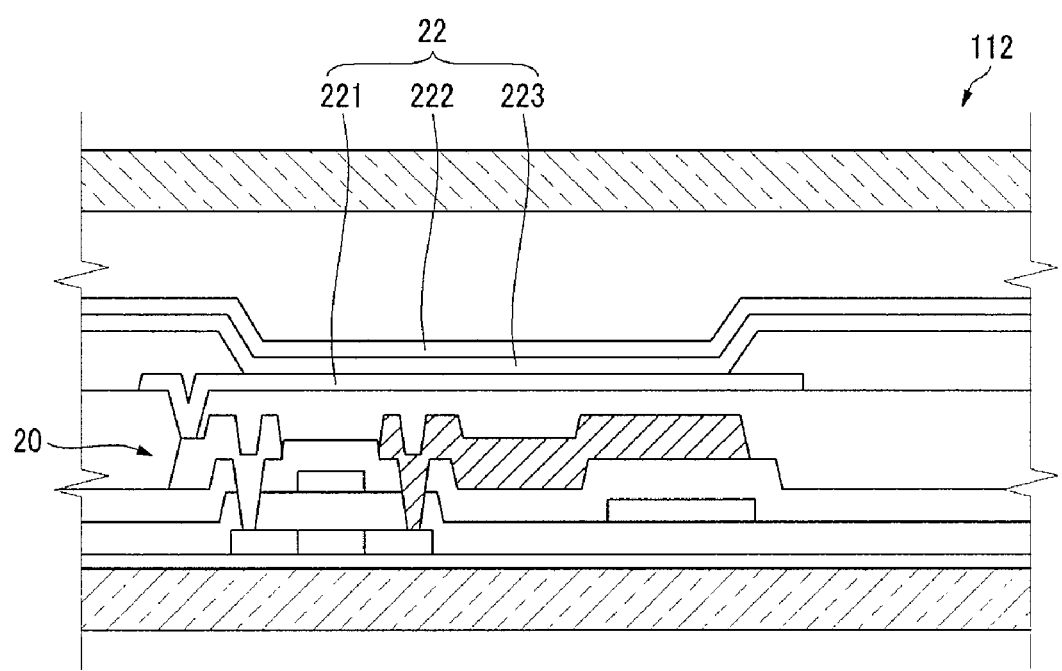
FIG. 2 is a partial cross-sectional view showing an organic light emitting display panel as a first example of a display unit shown in FIG. 1.
Figure 3:
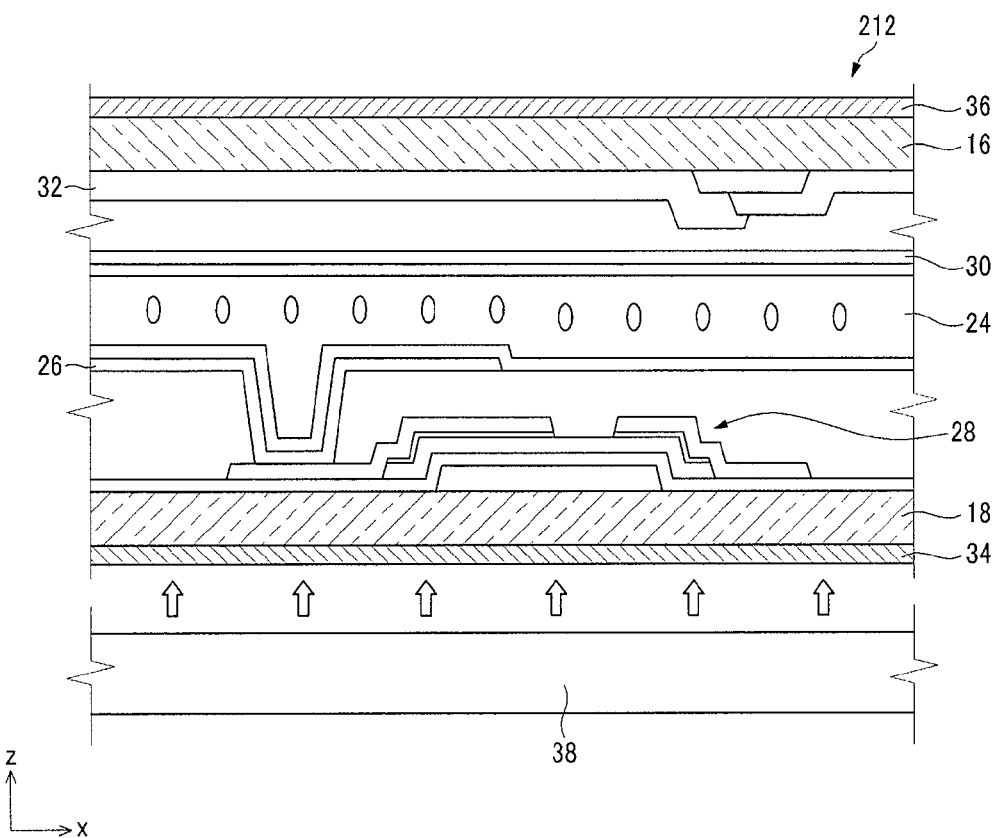
FIG. 3 is a partial cross-sectional view showing a liquid crystal display panel as a second example of the display unit shown in FIG. 1.

As examples of the display unit 12, FIG. 2 shows a cross-section of an active matrix type organic light emitting display panel, and FIG. 3 shows an active matrix type liquid crystal display panel.

Referring to FIG. 2, in each sub-pixel of an organic light emitting display panel 112, at least two thin film transistors 20 are provided, and an organic light emitting element 22 of which light emission is controlled by the thin film transistors 20 is also provided. The organic light emitting element 22 includes an anode electrode 221, a cathode electrode 222, and an organic emission layer 223 interposed between the anode electrode 221 and the cathode electrode 222.

When holes and electrons are injected into the organic emission layer 223 by the anode electrode 221 and the cathode electrode 222 respectively, electrons and holes in the organic emission layer 223 are combined to generate excitons. When the excitons are transitioned from the exited state to the ground state, energy is generated so that light is emitted.

Referring to FIG. 3, a liquid crystal display panel 212 includes a front substrate 16, a rear substrate 18, a liquid crystal layer 24 interposed between the front substrate 16 and the rear substrate 18, pixel electrodes 26 disposed at (or on) an inner surface of the rear substrate 18, and thin film transistors 28 that control driving of the pixel electrodes 26. In addition, the liquid crystal display panel 212 includes a common electrode 30 and color filters 32 disposed at (or on) an inner surface of the front substrate 16. The liquid crystal display panel 212 also includes a lower polarizing plate 34 disposed at an outer surface (or outside) of the rear substrate 18, an upper polarizing plate 36 disposed at an outer surface (or outside) of the front substrate 16, and a light source 38 disposed at an outer surface (or outside) of the lower polarizing plate 34.

When light emitted from the light source 38 is transmitted through the lower polarizing plate 34, the light is linearly polarized, and the linearly polarized light is applied to the liquid crystal layer 24. Due to a voltage difference between the pixel electrode 26 and the common electrode 30, an electric field is generated in the liquid crystal layer 24, and alignment of liquid crystal molecules is changed by the electric field. The light incident to the liquid crystal layer 24 is circularly or elliptically polarized by the rotated liquid crystal molecules. A transmittance, that is, the intensity of light transmitting through the upper polarizing plate 36 is controlled by a degree of polarization, so that the transmittance of each sub-pixel can be controlled.

Returning to FIG. 1, the liquid crystal barrier 14 includes a first substrate 40 and a second substrate 42 disposed to face each other, a liquid crystal layer disposed between the first substrate 40 and the second substrate 42, a first controller disposed at (or on) a first side of the liquid crystal layer to control light transmission of the liquid crystal barrier 14, and a second controller disposed at (or on) a second side of the liquid crystal layer to adjust a viewing angle of a screen. The first controller is constructed with a plurality of electrodes, and the second controller is constructed with at least one electrode.

In FIG. 1, first pad region(s) 44 of the rear substrate 18 are where external module(s), such as flexible printed circuits, are mounted to apply driving voltage(s) to the internal electrodes in the display unit 12. Second pad region(s) 46 of the first substrate 40 are where external module(s) are mounted to apply driving voltage(s) to the internal electrodes in the liquid crystal barrier 14.

The liquid crystal barrier 14 can selectively implement one of a 2-D wide viewing-angle mode (hereinafter also referred to as a wide viewing-angle mode), a 2-D narrow viewing-angle mode (hereinafter also referred to as a narrow viewing-angle mode), and a stereoscopic image mode by using the later-described internal structure and driving method.

When the display unit 12 displays a 2-D image, the liquid crystal barrier 14 becomes completely transmissive and adjusts a viewing angle of a screen to implement one of the wide and narrow viewing-angle modes. When the display unit 12 separately displays the left-eye and right-eye images in units of pixels or sub-pixels, the liquid crystal barrier 14 optically generates light blocking portions and light transmitting portions to separate the left-eye and right-eye images in terms of space.

In the accompanying drawings, a horizontal direction of the screen that is seen by an observer is indicated by the x-axis, and a vertical direction of the screen is indicated by the y-axis. In addition, a thickness direction of the electronic display device is indicated by the z-axis.

Figure 4:
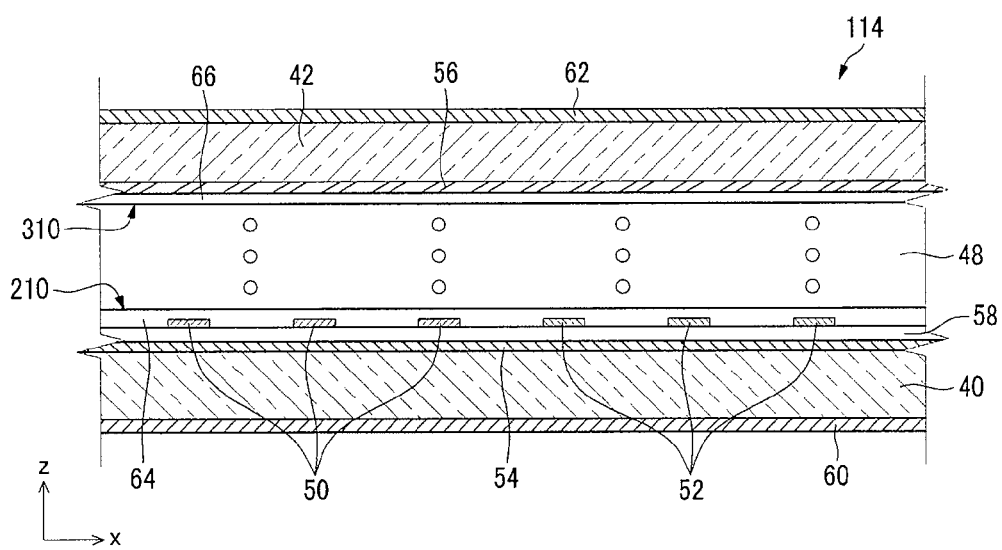
FIG. 4 is a partial cross-sectional view showing a liquid crystal barrier in the electronic display device shown in FIG. 1 according to a first exemplary embodiment.

FIG. 4 is a partial cross-sectional view showing a liquid crystal barrier in the electronic display device shown in FIG. 1 according to a first exemplary embodiment.

Referring to FIG. 4, the liquid crystal barrier 114 according to the first exemplary embodiment includes a first substrate 40 and a second substrate 42 disposed to face each other, a liquid crystal layer 48 that is disposed between the first substrate 40 and the second substrate 42, first electrodes 50 and second electrodes 52 that are alternately disposed at (or on) an inner surface of the first substrate 40 along a first direction (x-axis direction) of the liquid crystal barrier 114, a third electrode 54 that is insulated from the first electrodes 50 and the second electrodes 52, and a fourth electrode 56 disposed at (or on) an inner surface of the second substrate 42.

The first electrodes 50, the second electrodes 52, and the third electrode 54 disposed in the first substrate 40 constitute a first controller 210 for controlling light transmission of the liquid crystal barrier 114. The fourth electrode 56 disposed in the second substrate 42 constitutes a second controller 310 for adjusting a viewing angle of a screen. The fourth electrode 56 is formed over (or substantially over) the entire active area of the second substrate 42.

Figure 5:
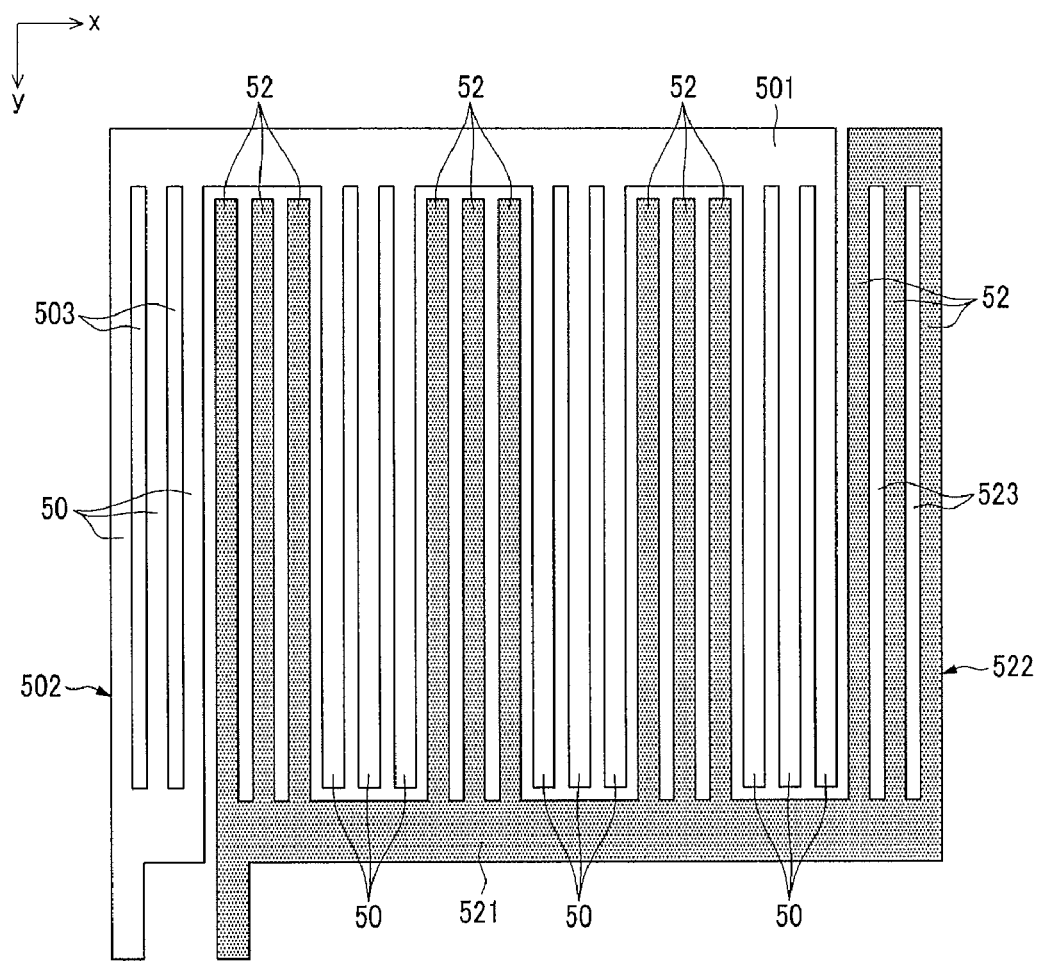
FIG. 5 is a schematic plan view showing first and second electrodes in the liquid crystal barrier shown in FIG. 4.

FIG. 5 is a schematic plan view showing the first and second electrodes in the liquid crystal barrier shown in FIG. 4.

Referring to FIGS. 4 and 5, the first electrodes 50 are spaced apart from each other by an interval along the first direction (x-axis direction) of the liquid crystal barrier 114 (e.g., in sets of three first electrodes 50), and the second electrodes 52 are arranged between the first electrodes 50 along the first direction (in sets of three second electrodes 52). A first connection electrode 501 is provided to (or coupled to) one-side ends of the first electrodes 50. The first connection electrode 501 and the first electrodes 50 constitute a first electrode set 502. A second connection electrode 521 is also provided to (or coupled to) one-side ends of the second electrodes 52. The second connection electrode 521 and the second electrodes 52 constitute a second electrode set 522.

The third electrode 54 is formed over (or substantially over) the entire active area of the first substrate 40. The third electrode 54 is disposed under the first and second electrodes 50 and 52 with a first insulating layer 58 interposed therebetween. That is, the third electrode 54 is disposed to be closer to the first substrate 40 than the first and second electrodes 50 and 52 are. A thickness of the first insulating layer 58 is smaller than that of the liquid crystal layer 48, so that only the electrodes constituting the first controller 210 generate the electric field in the liquid crystal layer 48.

The first electrodes 50 (and/or the first connection electrode 501) have (or define) one or more first openings 503 to expose some portions of the surface of the first insulating layer 58, and the second electrodes 52 (and/or) the second connection electrode 502 have (or define) one or more second openings 523 to expose some portions of the surface of the first insulating layer 58. The third electrode 54 can influence the liquid crystal layer 48 through the openings 503 and 523, so that alignment directions of the liquid crystal molecules can be changed. Each of the openings 503 and 523 may be formed in a shape of a slit that extends in parallel to the longitudinal direction (y-axis direction) of the first and second electrodes 50 and 52.

The first substrate 40 may be a lower substrate facing the display unit 12. Alternatively, the second substrate 42 may be the lower substrate facing the display unit 12. The first electrodes 50, the second electrodes 52, the third electrode 54, and the fourth electrode 56 are constructed with a transparent conductive layer that is made of a transparent conductive material such as indium tin oxide (ITO) and/or indium zinc oxide (IZO).

Returning to FIG. 4, the liquid crystal barrier 114 includes a first polarizing plate 60 disposed at (or on) an outer surface of the first substrate 40, a second polarizing plate 62 disposed at (or on) an outer surface of the second substrate 42, a first alignment layer 64 disposed at (or on) an inner surface of the first substrate 40 to cover the first electrodes 50 and the second electrodes 52, and a second alignment layer 66 disposed at (or on) an inner surface of the second substrate 42 to cover the fourth electrode 56.

Figure 6:
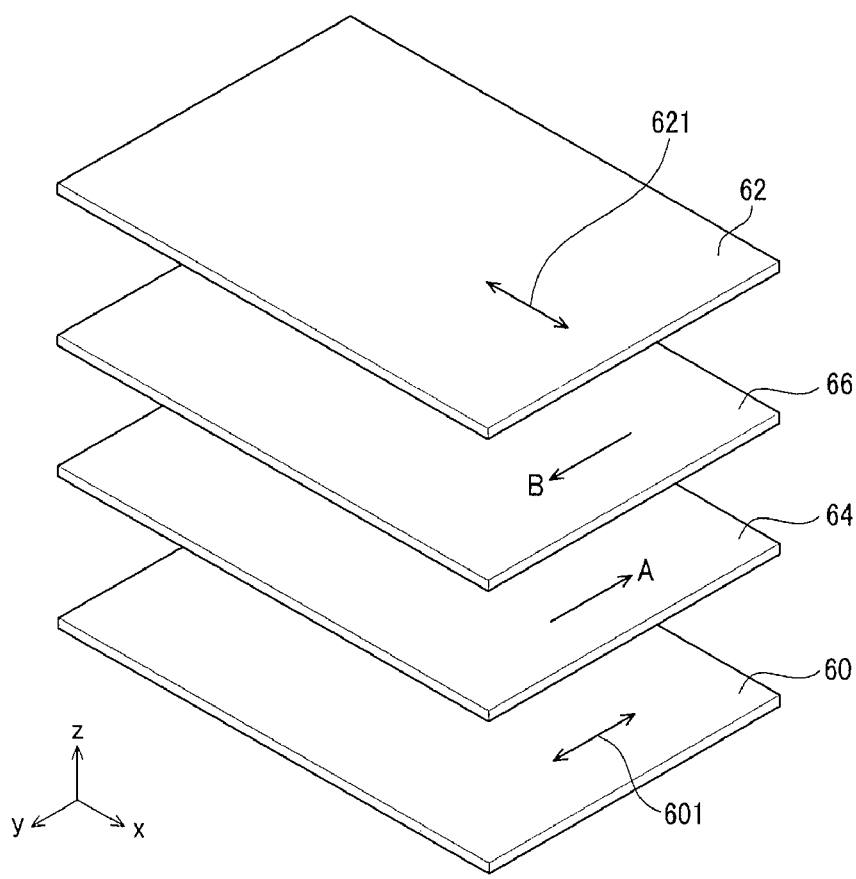
FIG. 6 is a schematic perspective view showing first and second polarizing plates and first and second alignment layers in the liquid crystal barrier shown in FIG. 4.
Figure 7:
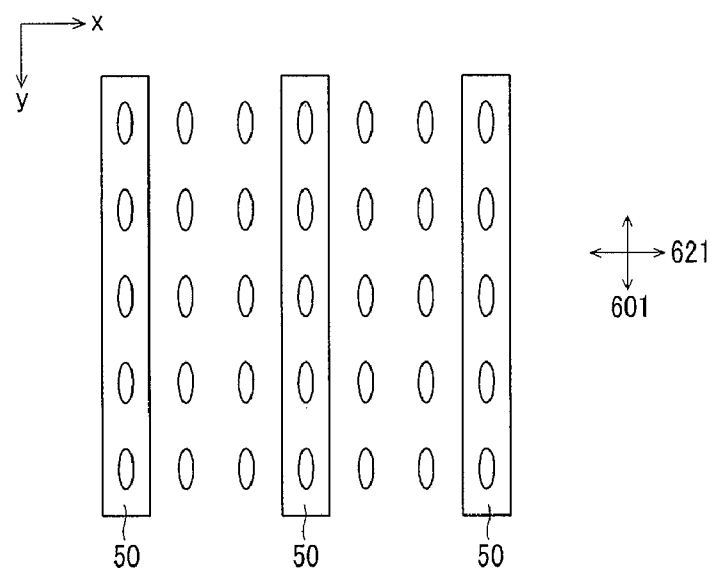
FIG. 7 is a partial plan view showing a voltage non-applied state of a first controller in the liquid crystal barrier shown in FIG. 4.

FIG. 6 is a schematic perspective view showing the first and second polarizing plates and the first and second alignment layers in the liquid crystal barrier shown in FIG. 4, and FIG. 7 is a partial plan view showing a voltage non-applied state of the first controller in the liquid crystal barrier shown in FIG. 4.

Referring to FIGS. 6 and 7, the first polarizing plate 60 has a first polarization axis 601, and the second polarizing plate 62 has a second polarization axis 621 crossing (or perpendicular to) the first polarization axis 601. Rubbing for the first alignment layer 64 may be performed in a direction parallel to the first polarization axis 601, and rubbing for the second alignment layer 66 may be performed in a direction that is parallel to the first polarization axis 601 but rotated by 180 degrees from the alignment direction of the first alignment layer 64.

In FIG. 6, the alignment direction of the first alignment layer 64 is indicated by an arrow A, and the alignment direction of the second alignment layer 66 is indicated by an arrow B. The alignment directions of the first and second alignment layers 64 and 66 are anti-parallel to each other.

In the initial alignment state, the liquid crystal molecules of liquid crystal layer 48 are disposed to be parallel to the inner surface of the first substrate 40 and the inner surface of the second substrate 42 and aligned in one of the polarization axes of the first and second polarizing plates 60 and 62, for example, the first polarization axis 601. Therefore, the liquid crystal barrier 114 in the voltage non-applied state is in a normally black mode where light transmission is blocked.

Figure 8:
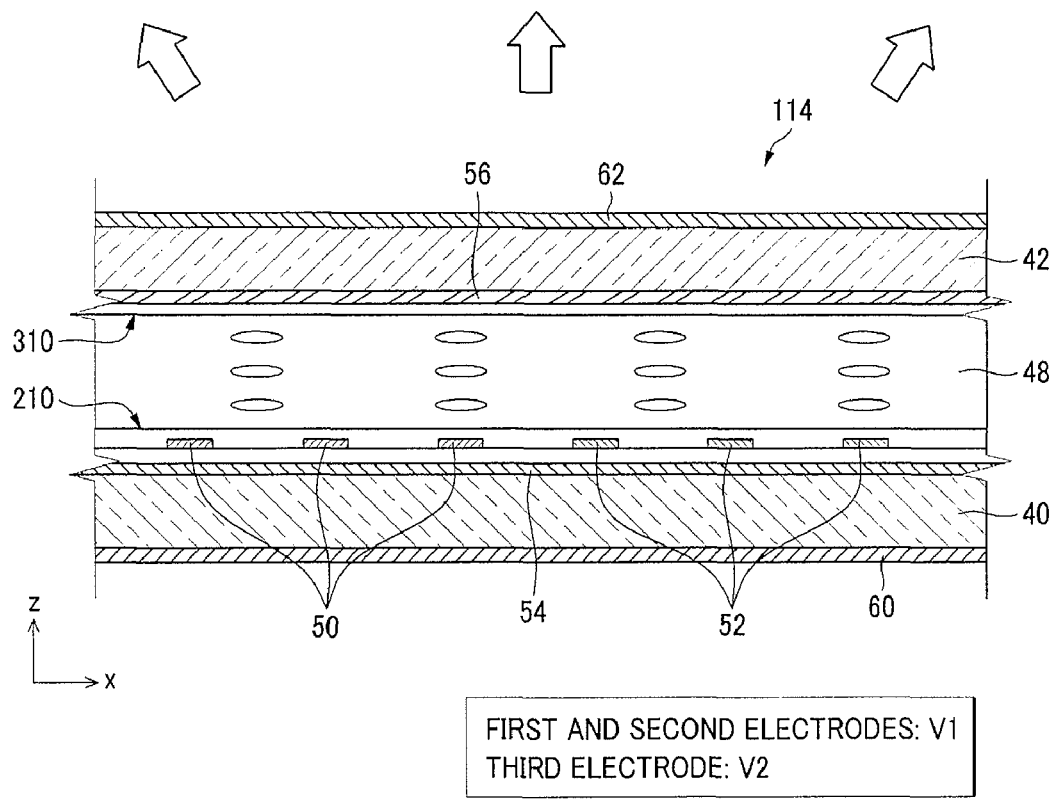
FIG. 8 is a partial cross-sectional view showing a wide viewing-angle mode of the liquid crystal barrier shown in FIG. 4.
Figure 9:
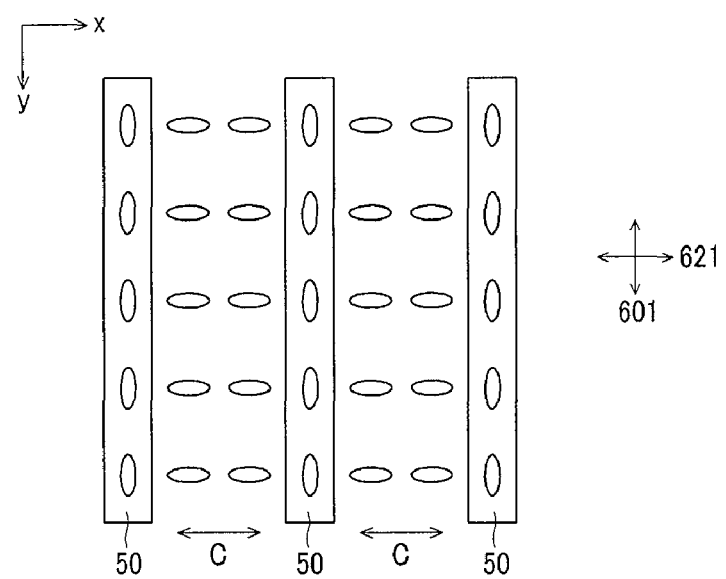
FIG. 9 is a partial plan view of the liquid crystal barrier shown in FIG. 8.

FIG. 8 is a partial cross-sectional view showing the wide viewing-angle mode of the liquid crystal barrier shown in FIG. 4, and FIG. 9 is a partial plan view of the liquid crystal barrier shown in FIG. 8.

Referring to FIGS. 8 and 9, a first voltage V1 is applied to the first electrodes 50 and the second electrodes 52, and a second voltage V2 is applied to the third electrode 54. A voltage difference between the first and second voltages V1 and V2 is equal to or larger than a threshold value. Due to the voltage difference between the first and second voltages V1 and V2, a horizontal electric field is generated in the liquid crystal layer 48. In FIG. 9, the direction of the horizontal electric field is indicated by an arrow C.

While the liquid crystal molecules are maintained in the state in which the liquid crystal molecules are parallel to the inner surface of the first substrate 40 and the inner surface of the second substrate 42, the liquid crystal molecules are rotated by the horizontal electric field, so that the major axes of the liquid crystal molecules are aligned with the electric field direction. Therefore, the major axes of the liquid crystal molecules are aligned with one of the polarization axes of the first and second polarizing plates 60 and 62, for example the second polarization axis 621, so that the liquid crystal barrier 114 becomes completely transmissive.

Accordingly, in a case where an observer in front of a side position of the electronic display device observes the screen of the electronic display device, since birefringence of the liquid crystal in the observing direction is not greatly changed, the electronic display device has a wide viewing-angle characteristic.

Figure 10:
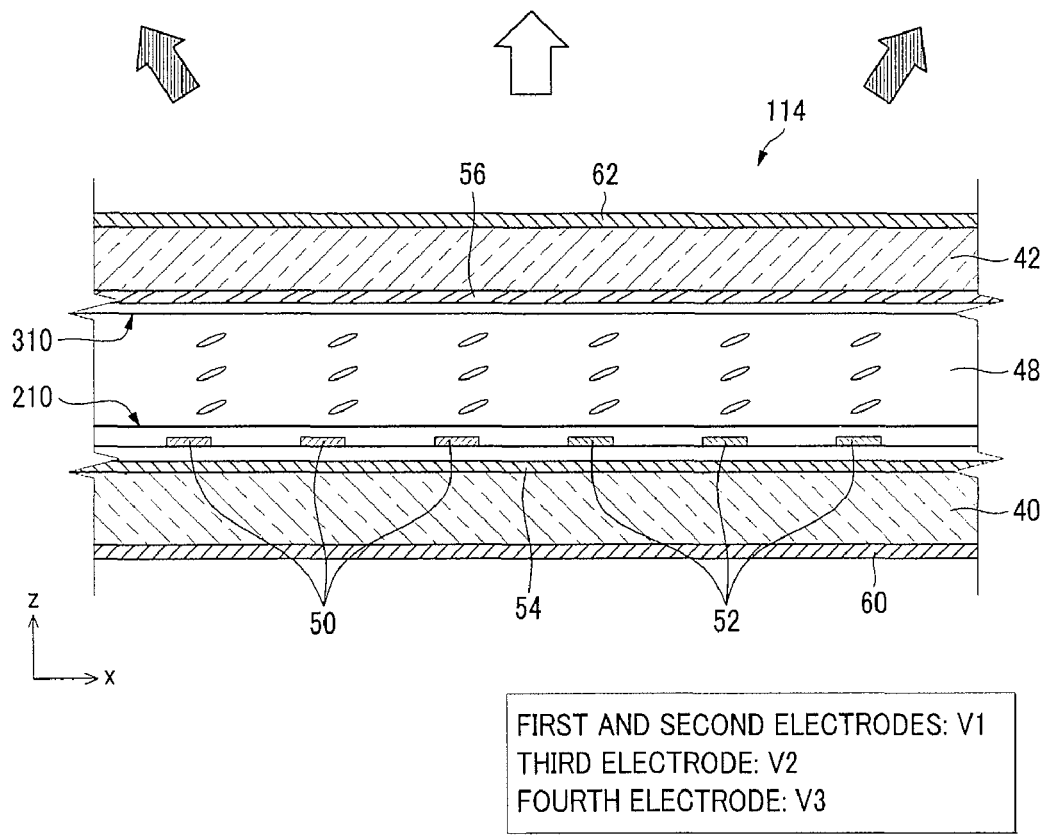
FIG. 10 is a partial cross-sectional view showing a narrow viewing-angle mode of the liquid crystal barrier shown in FIG. 4.

FIG. 10 is a partial cross-sectional view showing the narrow viewing-angle mode of the liquid crystal barrier shown in FIG. 4.

Referring to FIG. 10, a first voltage V1 is applied to the first electrodes 50 and the second electrodes 52, a second voltage V2 is applied to the third electrode 54, and a third voltage V3 is applied to the fourth electrode 56. A voltage difference between the first and second voltages V1 and V2 is equal to or larger than a threshold value. The voltage difference between the second and third voltages V2 and V3 may be smaller than the voltage difference between the first and second voltages V1 and V2.

Due to the voltage difference between the first and second voltages V1 and V2, a horizontal electric field is generated in the liquid crystal layer 48, and the liquid crystal molecules are rotated by the horizontal electric field so that the liquid crystal barrier 114 becomes completely transmissive. In addition, due to the voltage difference between the second and third voltages V2 and V3, a vertical electric field is generated in the liquid crystal layer 48, and the liquid crystal molecules are raised up at an angle (or a predetermined angle) by the vertical electric field, so that the liquid crystal molecules are vertically arranged at a slanted angle.

In a case where an observer in front of a side position of the electronic display device observes the screen of the electronic display device in this state, since a phase difference occurs according to the observing direction, the screen cannot be clearly seen by the observer. Accordingly, the electronic display device has a narrow viewing-angle characteristic.

Figure 11:
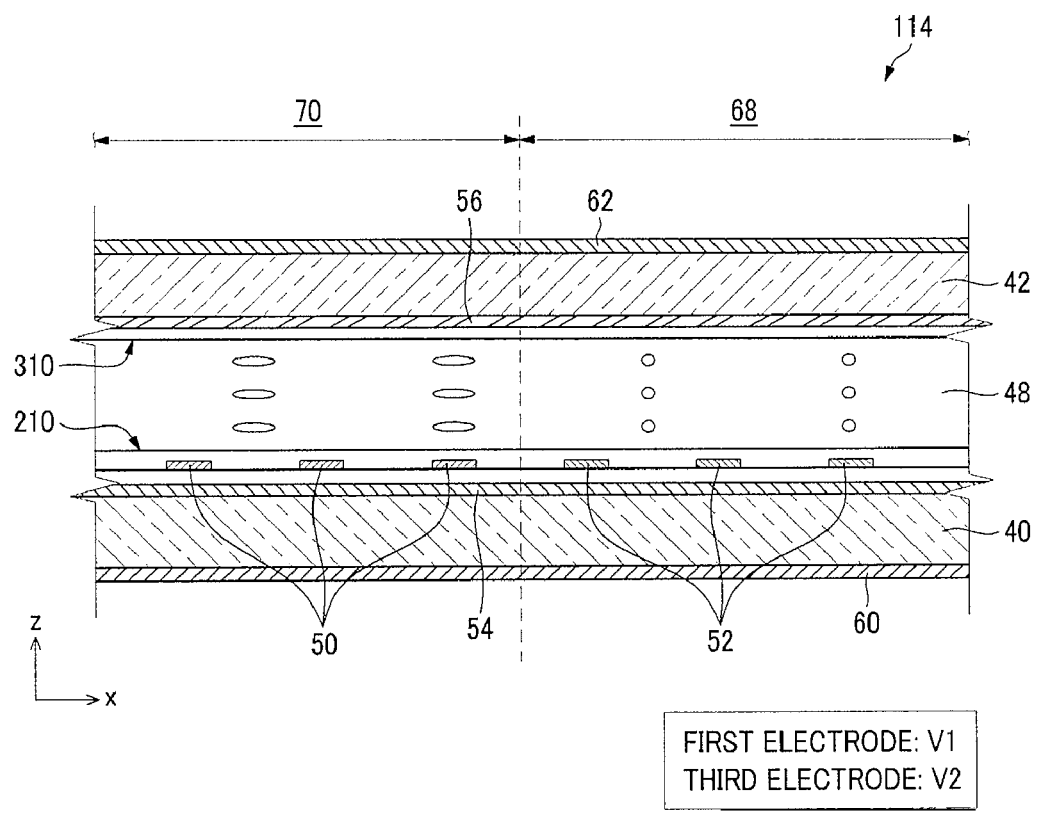
FIG. 11 is a partial cross-sectional view showing a stereoscopic image mode of the liquid crystal barrier shown in FIG. 4.

FIG. 11 is a partial cross-sectional view showing the stereoscopic image mode of the liquid crystal barrier shown in FIG. 4.

Referring to FIG. 11, a first voltage V1 is applied to the first electrodes 50 or the second electrodes 52, and a second voltage V2 is applied to the third electrode 54. A voltage difference between the first and second voltages V1 and V2 is equal to or larger than a threshold value. As an example, FIG. 11 shows a case where the first voltage V1 is applied to the first electrodes 50.

Due to the voltage difference between the first and second voltages V1 and V2, a horizontal electric field is generated in the regions of liquid crystal layer 48 where the first electrodes 50 are disposed, so that the regions where the first electrodes 50 are disposed become transmissive (or at least partially transmissive). Accordingly, the regions of the liquid crystal barrier 114 where the second electrodes 52 are disposed become light blocking portions 68 where the initial black state is maintained, and the regions where the first electrodes 50 are disposed become light transmitting portions 70.

Figure 12:
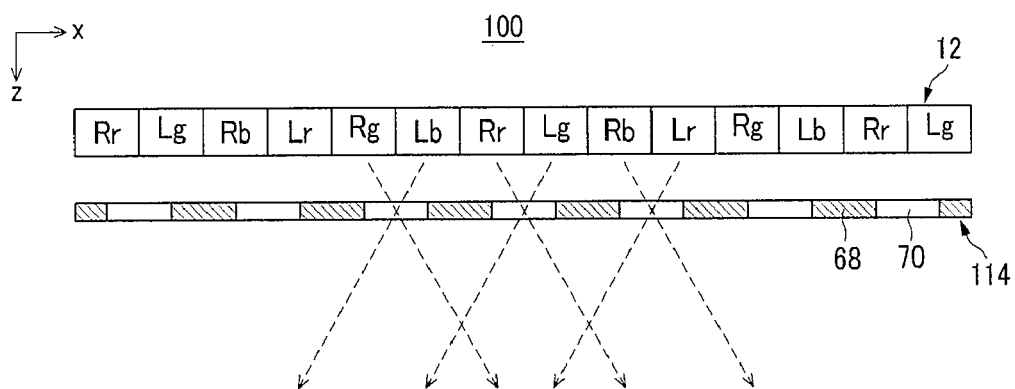
FIG. 12 is a partial cross-sectional view showing a stereoscopic image mode of an electronic display device including the liquid crystal barrier shown in FIG. 4.

FIG. 12 is a schematic partial cross-sectional view showing a stereoscopic image mode of an electronic display device including the liquid crystal barrier shown in FIG. 4.

Referring to FIG. 12, the display unit 12 is applied with left-eye and right-eye image signals in units of pixels or sub-pixels to display a left-eye image and a right-eye image separately. As an example, FIG. 12 shows a case where the left-eye and right-eye images are displayed separately in units of sub-pixels. In FIG. 12, Rr, Rg, and Rb denote red, green, and blue sub-pixels for displaying the right-eye image, and Lr, Lg, and Lb denote red, green, and blue sub-pixels for displaying the left-eye image.

Since the liquid crystal barrier 114 is optically divided into the light blocking portions 68 and the light transmitting portions 70, the left-eye and right-eye images displayed by the display unit 12 are separately directed to the left and right eyes of the observer by the liquid crystal barrier 114, respectively. As a result, the observer observing the electronic display device 100 can see a stereoscopic image from the images displayed by the display unit 12.

The present invention is not limited to the aforementioned driving method for the wide viewing-angle mode, the narrow viewing-angle mode, and the stereoscopic image mode in the liquid crystal barrier 114 according to the first exemplary embodiment, but it may be modified in various suitable manners according to types of liquid crystal, polarizing plate, and alignment layer.

Figure 13:
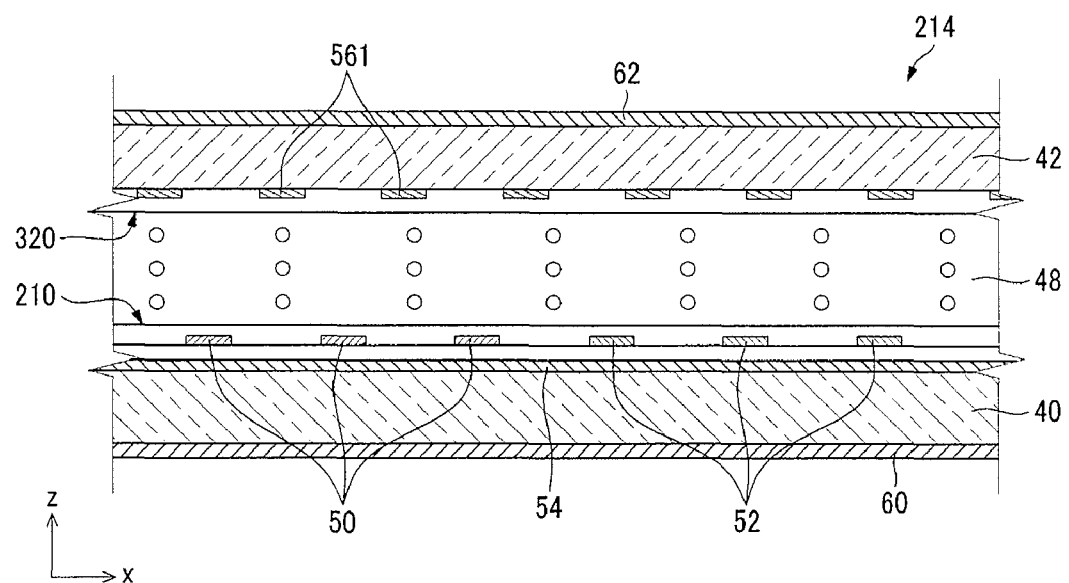
FIG. 13 is a partial cross-sectional view showing a liquid crystal barrier in the electronic display device shown in FIG. 1 according to a second exemplary embodiment.
Figure 14:
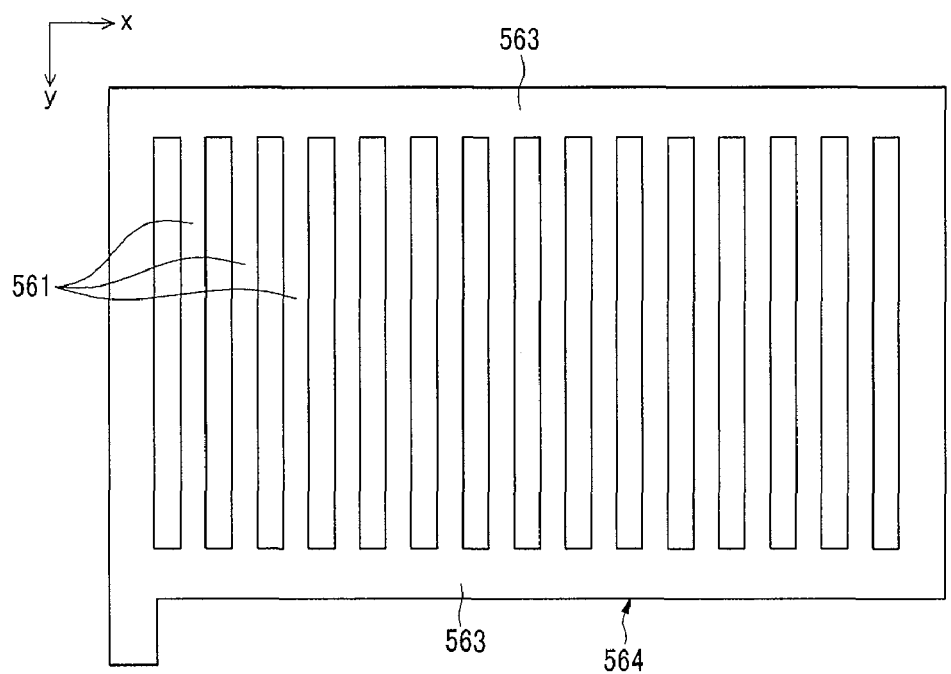
FIG. 14 is a partial plan view showing fourth electrodes in the liquid crystal barrier shown in FIG. 13.
Figure 15:
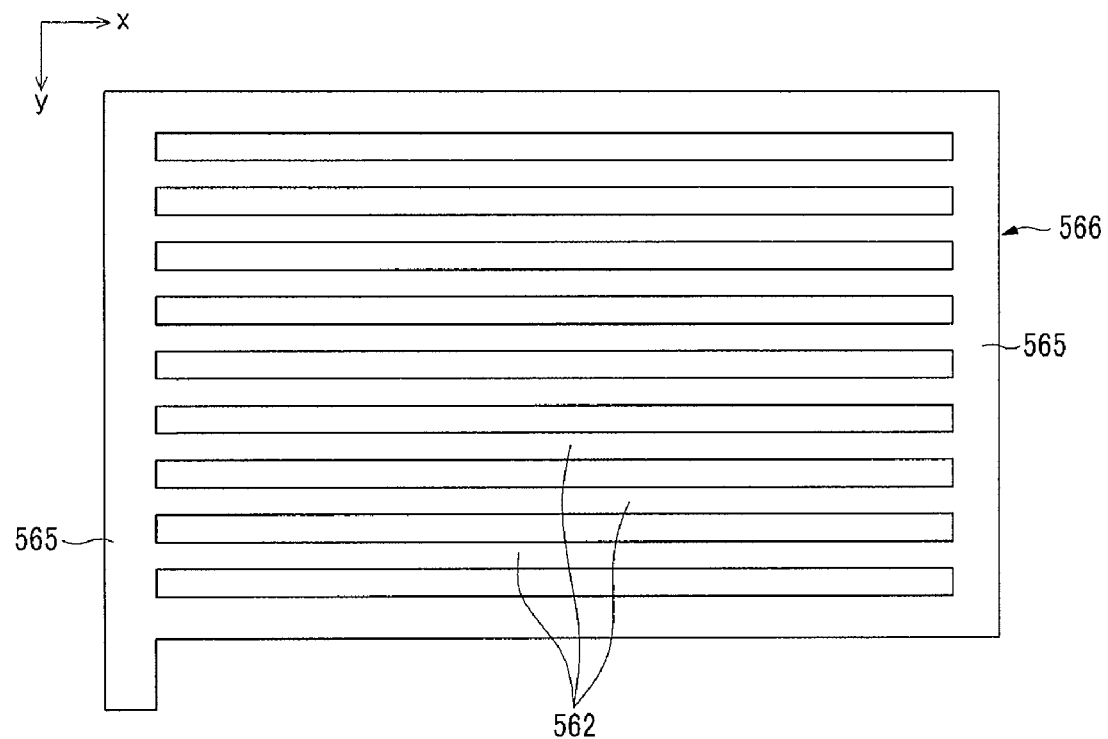
FIG. 15 is a partial plan view showing a modified example of the fourth electrodes shown in FIG. 14.

FIG. 13 is a partial cross-sectional view showing a liquid crystal barrier in the electronic display device shown in FIG. 1 according to a second exemplary embodiment of the present invention, FIG. 14 is a plan view showing fourth electrodes in the liquid crystal barrier shown in FIG. 13, and FIG. 15 is a plan view showing a modified example of the fourth electrodes shown in FIG. 14.

Referring to FIG. 13, the liquid crystal barrier 214 according to the second exemplary embodiment has the same (or substantially the same) construction as that of the liquid crystal barrier 114 according to the first exemplary embodiment except for a later-described second controller 320. The same elements as those of the first exemplary embodiment are denoted by the same reference numerals.

In the liquid crystal barrier 214 according to the second exemplary embodiment, the second controller 320 is constructed with fourth electrodes 561 and 562 that are spaced apart each other by an interval (or a predetermined interval) along one direction of the liquid crystal barrier 214. As shown in FIG. 14, the fourth electrodes 561 may be spaced apart from each other by an interval (or predetermined interval) along the first direction (x-axis direction) of the liquid crystal barrier 214.

Additionally, as shown in FIG. 15, the fourth electrodes 562 may be spaced apart from each other by an interval (or a predetermined interval) along the second direction (y-axis direction in FIG. 15) crossing (or perpendicular to) the first direction (x-axis direction).

In FIG. 14, fourth connection electrodes 563 are provided to (or coupled to) both-side ends of the fourth electrodes 561. The fourth connection electrodes 563 and the fourth electrodes 561 constitute a fourth electrode set 564. In FIG. 15, fourth connection electrodes 565 are provided to (or coupled to) both-side ends of the fourth electrodes 562. The fourth connection electrodes 565 and the fourth electrodes 562 constitute a fourth electrode set 566.

The liquid crystal barrier 214 has a viewing-angle characteristic in which the viewing angle is narrowed according to the longitudinal directions of the fourth electrodes 561 and 562 in the narrow viewing-angle mode. In FIG. 14, the longitudinal direction of the fourth electrodes 561 is aligned with the vertical direction (y-axis direction) of the screen. In FIG. 15, the longitudinal direction of the fourth electrodes 562 is aligned with the horizontal direction (x-axis direction) of the screen.

The liquid crystal barrier 214 according to the present exemplary embodiment can implement the narrow/wide viewing-angle modes and the stereoscopic image mode in the same (or substantially the same) operating conditions as those of the liquid crystal barrier 114 according to the first exemplary embodiment. The operation in the narrow viewing-angle mode can be implemented as follows.

Figure 16:
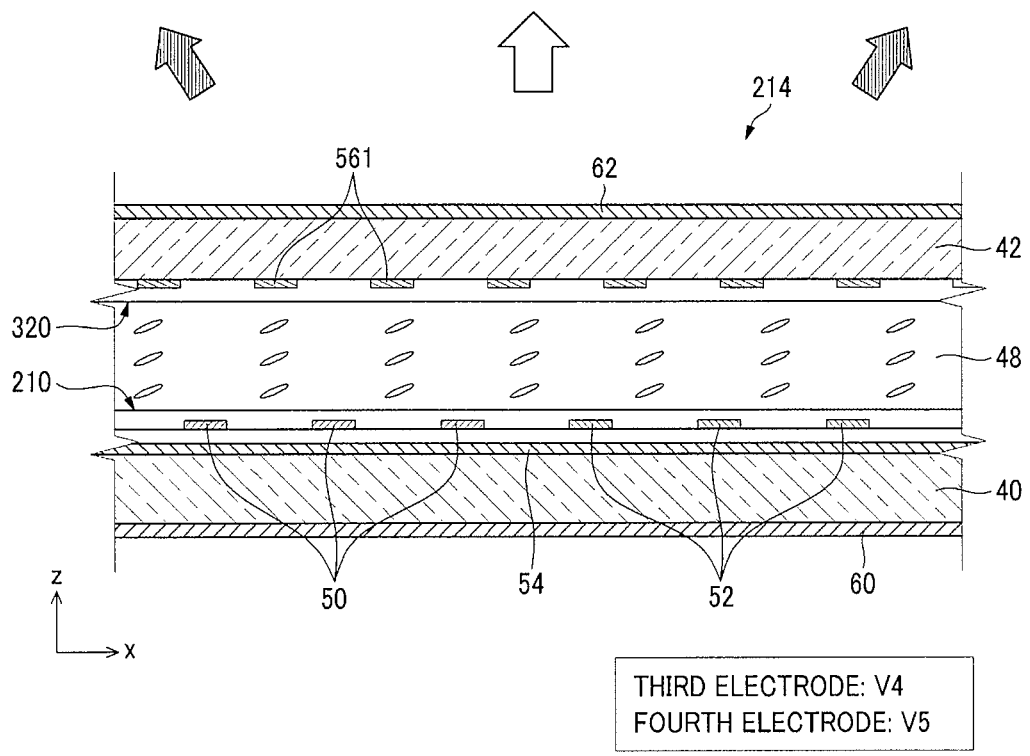
FIG. 16 is a partial cross-sectional view showing a narrow viewing-angle mode of the liquid crystal barrier shown in FIG. 13.

FIG. 16 is a partial cross-sectional view showing the narrow viewing-angle mode of the liquid crystal barrier shown in FIG. 13.

Referring to FIG. 16, a fourth voltage V4 is applied to the third electrode 54, and a fifth voltage V5 is applied to the fourth electrodes 561 and 562. A voltage difference between the fourth and fifth voltages V4 and V5 is equal to or larger than a threshold value. Due to the voltage difference between the fourth and fifth voltages V4 and V5, a vertical electric field is generated in the liquid crystal layer 48. Therefore, the alignment directions of the liquid crystal molecules are changed, so that the liquid crystal barrier 214 becomes completely transmissive.

Here, a horizontal electric field is generated in the width direction (x-axis direction in FIG. 14 and y-axis direction in FIG. 15) of the fourth electrodes 561 and 562 in upper portions of the liquid crystal layer 48 between the fourth electrodes 561 and 562 under the second substrate 42, so that the viewing angle is narrowed according to the direction perpendicular to the horizontal electric field, that is, the longitudinal directions (y-axis direction in FIG. 14 and x-axis direction in FIG. 15) of the fourth electrodes 561 and 562.

As a result, in FIG. 14, the viewing angle of the liquid crystal barrier 214 including the fourth electrodes 561 is narrowed according to the vertical direction (y-axis direction) of the screen. In FIG. 15, the viewing angle of the liquid crystal barrier 214 including the fourth electrodes 562 is narrowed according to the horizontal direction (x-axis direction) of the screen. Accordingly, in the liquid crystal barrier 214 according to the present exemplary embodiment, the viewing angle can be adjusted in a specific direction according to the shapes of the fourth electrodes 561 and 562.

Figure 17:
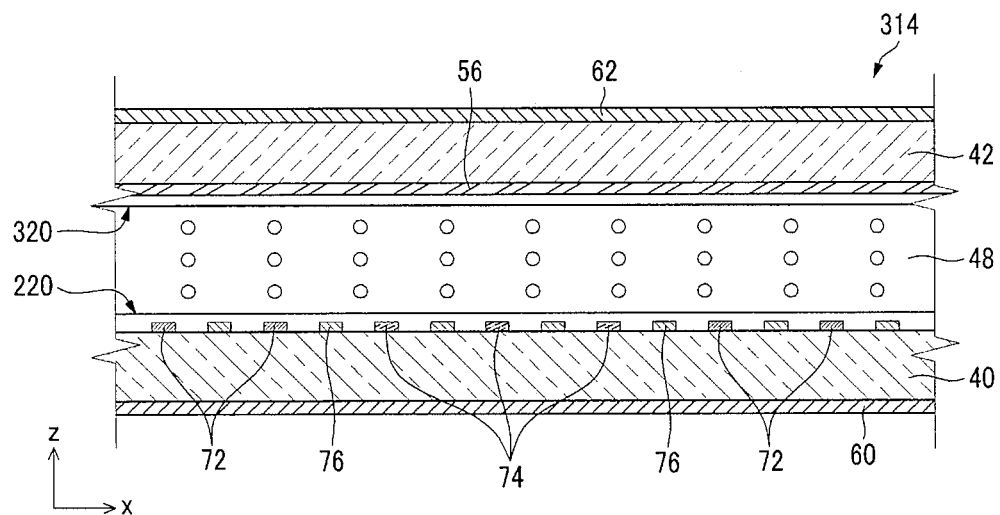
FIG. 17 is a partial cross-sectional view showing a liquid crystal barrier in the electronic display device shown in FIG. 1 according to a third exemplary embodiment.
Figure 18:
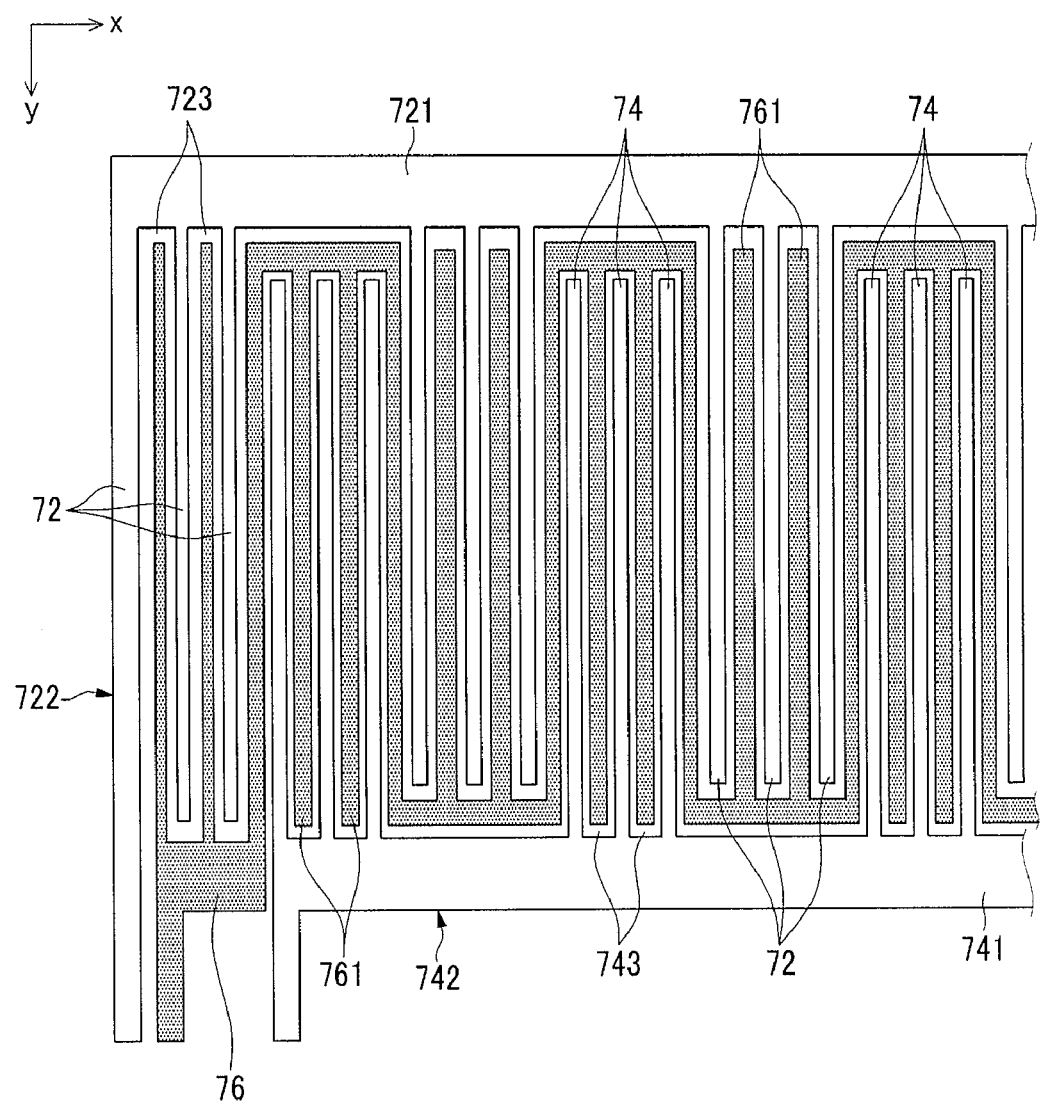
FIG. 18 is a schematic plan view showing first, second, and third electrodes in the liquid crystal barrier shown in FIG. 17.

FIG. 17 is a partial cross-sectional view showing a liquid crystal barrier in the electronic display device shown in FIG. 1 according to a third exemplary embodiment, and FIG. 18 is a schematic plan view showing the first, second, and third electrodes in the liquid crystal barrier shown in FIG. 17.

Referring to FIGS. 17 and 18, the liquid crystal barrier 314 according to the third exemplary embodiment includes first electrodes 72, second electrodes 74, and third electrodes 76 disposed in the same layer. Other constructions except for the electrodes are the same (or substantially the same) as those of the aforementioned first exemplary embodiment. The same elements as those of the first exemplary embodiment are denoted by the same reference numerals.

In the third exemplary embodiment, the first electrodes 72 and the second electrodes 74 are alternately (and/or repeatedly) disposed in the first direction (x-axis direction) of the liquid crystal barrier 314. A first connection electrode 721 is provided to (or coupled to) one-side ends of the first electrodes 72. The first connection electrode 721 and the first electrodes 72 constitute a first electrode set 722. A second connection electrode 741 is also provided to (or coupled to) one-side ends of the second electrodes 74. The second connection electrode 741 and the second electrodes 74 constitute a second electrode set 742. The third electrodes 76 are separated from the first electrodes 72 and the second electrodes 74. The third electrodes 76 are disposed in a zigzag shape between the first electrodes 72 and the second electrodes 74.

The first electrodes 72 include (or define) one or more first openings 723 that are open from the second connection electrode 741, and the second electrodes 74 include (or define) one or more second opening 743 that are open from the first connection electrode 721. The third electrodes 76 include extensions 761 that extend toward (or into) the first openings 723 and the second openings 743. The first electrodes 72, the second electrodes 74, and the third electrode 76 constitute a first controller 220.

Figure 19:
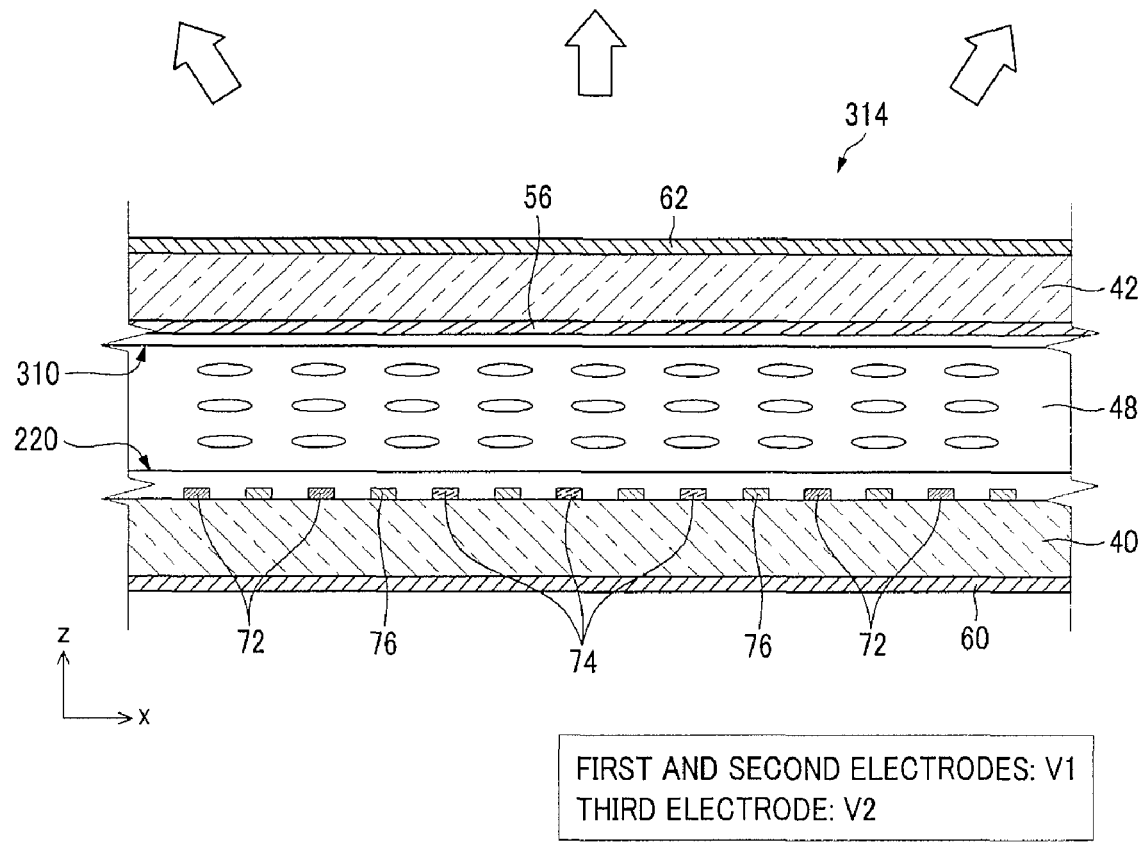
FIG. 19 is a partial cross-sectional view showing a wide viewing-angle mode of the liquid crystal barrier shown in FIG. 17.

FIG. 19 is a partial cross-sectional view showing the wide viewing-angle mode of the liquid crystal barrier shown in FIG. 17.

Referring to FIG. 19, a first voltage V1 is applied to the first electrodes 72 and the second electrodes 74, and a second voltage V2 is applied to the third electrode 76. A voltage difference between the first and second voltages V1 and V2 is equal to or larger than a threshold value. Due to the voltage difference between the first and second voltages V1 and V2, a horizontal electric field is generated in the liquid crystal layer 48.

While the liquid crystal molecules are maintained in the state in which the liquid crystal molecules are parallel to the inner surface of the first substrate 40 and the inner surface of the second substrate 42, the liquid crystal molecules are rotated by the horizontal electric field. Accordingly, in a case where an observer in front of a side position of the electronic display device observes the screen of the electronic display device, since birefringence of the liquid crystal in the observing direction is not greatly changed, the electronic display device has a wide viewing-angle characteristic.

Figure 20:
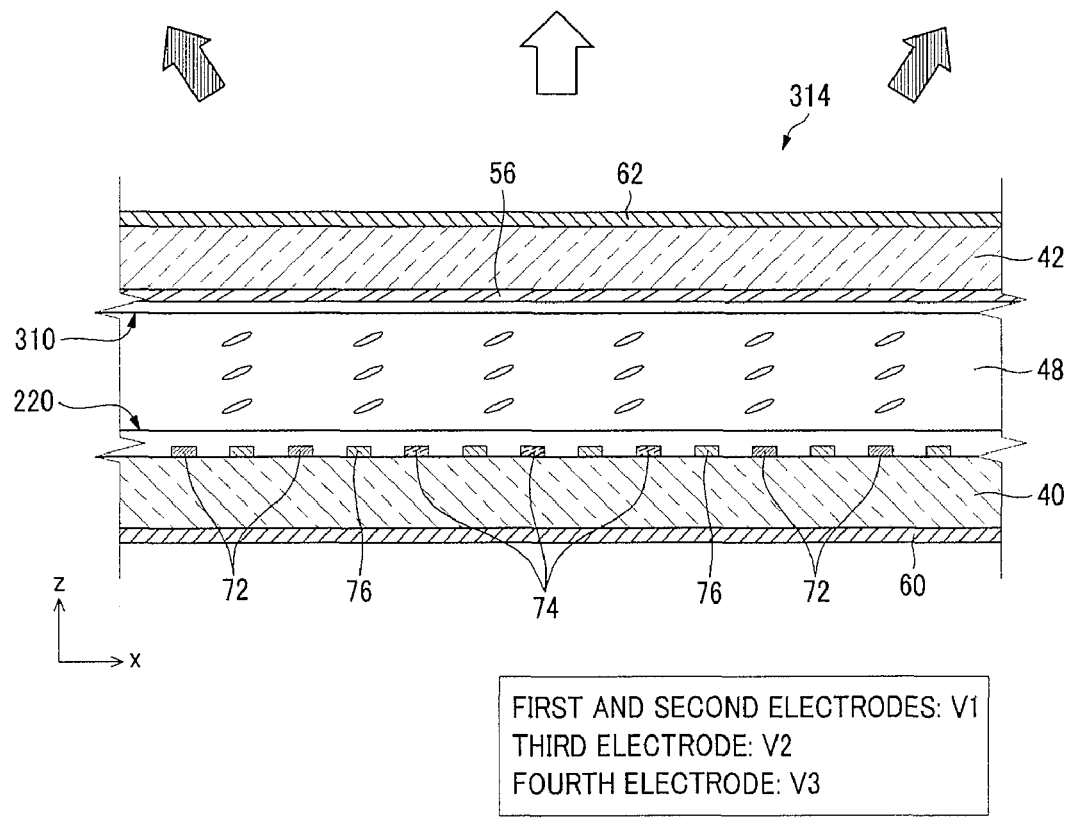
FIG. 20 is a partial cross-sectional view showing a narrow viewing-angle mode of the liquid crystal barrier shown in FIG. 17.

FIG. 20 is a partial cross-sectional view showing the narrow viewing-angle mode of the liquid crystal barrier shown in FIG. 17.

Referring to FIG. 20, a first voltage V1 is applied to the first electrodes 72 and the second electrodes 74, a second voltage V2 is applied to the third electrode 76, and a third voltage V3 is applied to the fourth electrode 56. A voltage difference between the first and second voltages V1 and V2 is equal to or larger than a threshold value. The voltage difference between the second and third voltages V2 and V3 may be smaller than the voltage difference between the first and second voltages V1 and V2.

Due to the voltage difference between the first and second voltages V1 and V2, a horizontal electric field is generated in the liquid crystal layer 48, and the liquid crystal molecules are rotated by the horizontal electric field, so that the liquid crystal barrier 314 becomes completely transmissive. In addition, due to the voltage difference between the second and third voltages V2 and V3, a vertical electric field is generated in the liquid crystal layer 48, and the liquid crystal molecules are raised up at an angle (or a predetermined angle) by the vertical electric field so that the liquid crystal molecules are vertically arranged at a slanted angle.

In a case where an observer in front of a side position of the electronic display device observes the screen of the electronic display device in this state, since a phase difference occurs according to the observing direction, the screen cannot be clearly seen by the observer. Accordingly, the electronic display device has a narrow viewing-angle characteristic.

Figure 21:
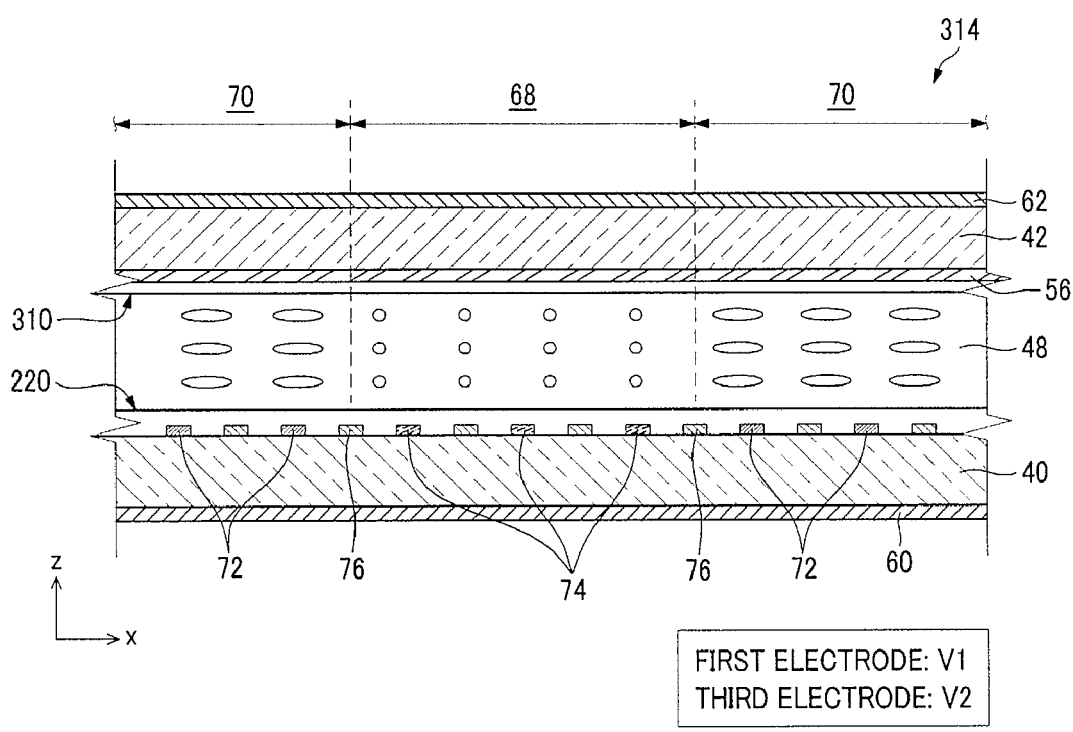
FIG. 21 is a partial cross-sectional view showing a stereoscopic image mode of the liquid crystal barrier shown in FIG. 17.

FIG. 21 is a partial cross-sectional view showing the stereoscopic image mode of the liquid crystal barrier shown in FIG. 17.

Referring to FIG. 21, a first voltage V1 is applied to the first electrodes 72 or the second electrodes 74, and a second voltage V2 is applied to the third electrode 76. A voltage difference between the first and second voltages V1 and V2 is equal to or larger than a threshold value. As an example, FIG. 21 shows a case where the first voltage V1 is applied to the first electrodes 72.

Due to the voltage difference between the first and second voltages V1 and V2, a horizontal electric field is generated in the regions of liquid crystal layer 48 where the first electrodes 72 are disposed, so that the regions where the first electrodes 72 are disposed becomes transmissive (or at least partially transmissive). Accordingly, the regions of the liquid crystal barrier 314 where the second electrodes 74 are disposed become the light blocking portions 68 where the initial black state is maintained, and the regions where the first electrodes 72 are disposed become the light transmitting portions 70.

Figure 22:
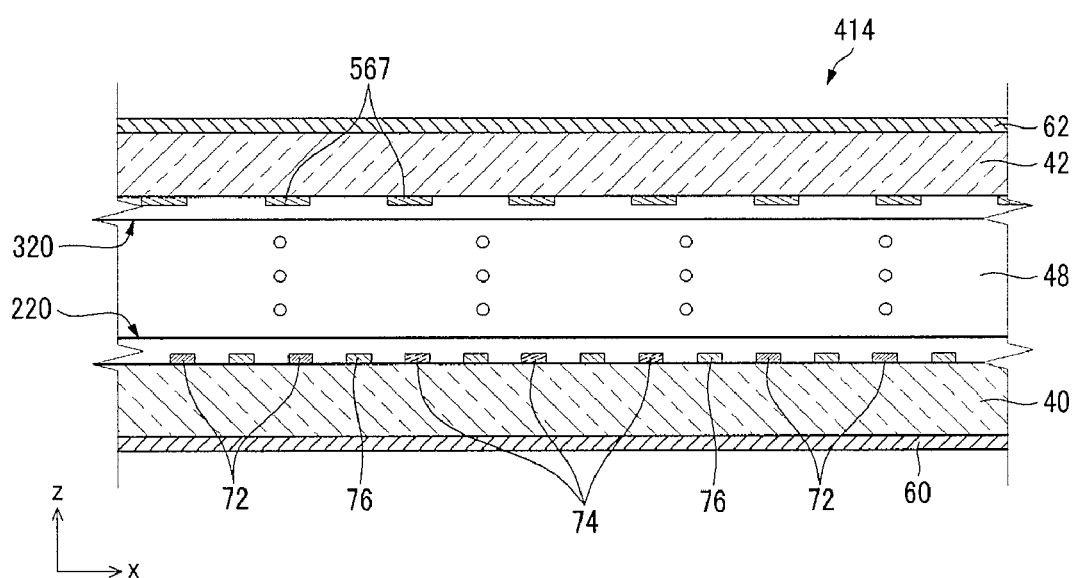
FIG. 22 is a partial cross-sectional view showing a liquid crystal barrier in the electronic display device shown in FIG. 1 according to a fourth exemplary embodiment.

FIG. 22 is a partial cross-sectional view showing a liquid crystal barrier in the electronic display device shown in FIG. 1 according to a fourth exemplary embodiment.

Referring to FIG. 22, the liquid crystal barrier 414 according to the fourth exemplary embodiment includes a plurality of fourth electrodes 567 spaced apart from each other by an interval (or a predetermined interval) along one direction of the liquid crystal barrier 414. Other constructions except for the fourth electrodes 567 are the same (or substantially the same) as those of the aforementioned third exemplary embodiment. The same elements as those of the third exemplary embodiment are denoted by the same reference numerals.

The fourth electrodes 567 may have the same shape as that of the fourth electrodes according to the second exemplary embodiment. In other words, the fourth electrodes 567 may have the same shape as that of the fourth electrodes 561 shown in FIG. 14 or the fourth electrodes 562 shown in FIG. 15.

The liquid crystal barrier 414 according to the fourth exemplary embodiment can implement the wide viewing-angle mode and the stereoscopic image mode in the same operating conditions as those of the liquid crystal barrier 314 according to the third exemplary embodiment. The operation in the narrow viewing-angle mode can be implemented as follows.

Figure 23:
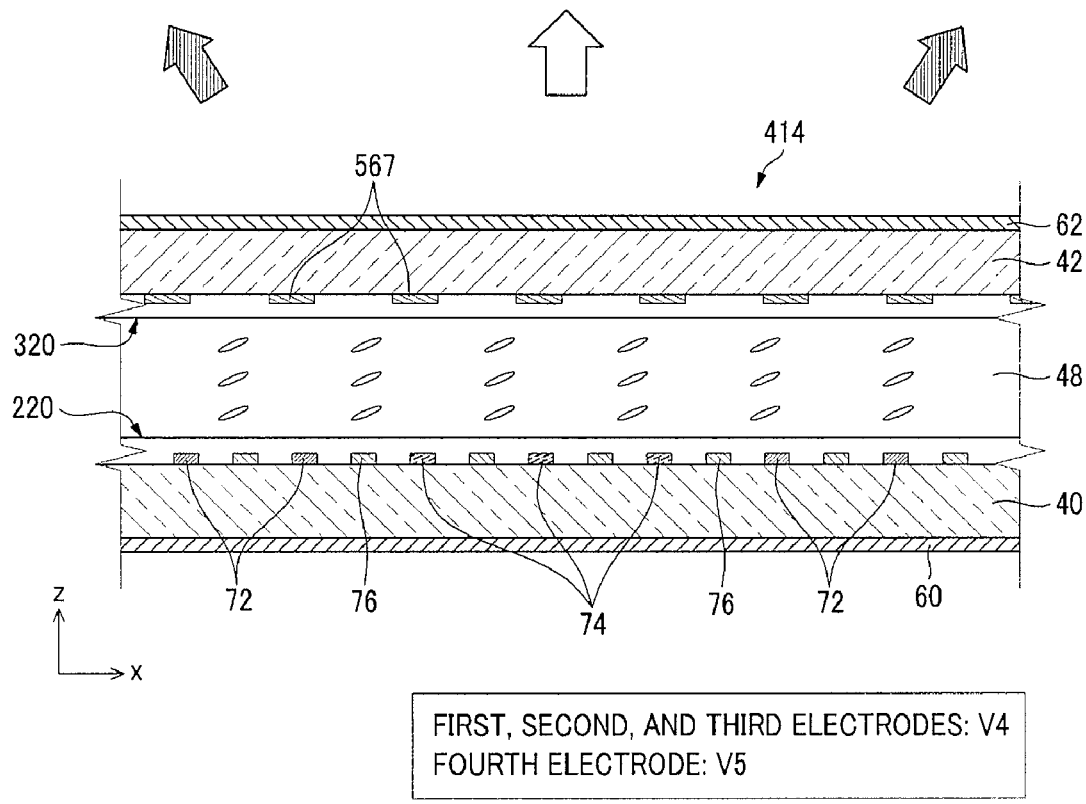
FIG. 23 is a partial cross-sectional view showing a narrow viewing-angle mode of the liquid crystal barrier shown in FIG. 22.

FIG. 23 is a partial cross-sectional view showing the narrow viewing-angle mode of the liquid crystal barrier shown in FIG. 22.

Referring to FIG. 23, a fourth voltage V4 is applied to the first electrodes 72, the second electrodes 74, and the third electrode 76, and a fifth voltage V5 is applied to the fourth electrode 567. A voltage difference between the fourth and fifth voltages V4 and V5 is equal to or larger than a threshold value. Due to the voltage difference between the fourth and fifth voltages V4 and V5, a vertical electric field is generated in the liquid crystal layer 48. Therefore, the alignment directions of the liquid crystal molecules are changed, so that the liquid crystal barrier 414 becomes completely transmissive.

At this time, a horizontal electric field is generated in the width direction of the fourth electrodes 567 in upper portions of the liquid crystal layer 48 between the fourth electrodes 567 under the second substrate 42, so that the viewing angle is narrowed according to the direction perpendicular to the horizontal electric field. As a result, the viewing angle is narrowed according to the longitudinal directions of the fourth electrodes 567. Accordingly, in the liquid crystal barrier 414 according to the exemplary embodiment, the viewing angle can be adjusted in a specific direction.

Figure 24:
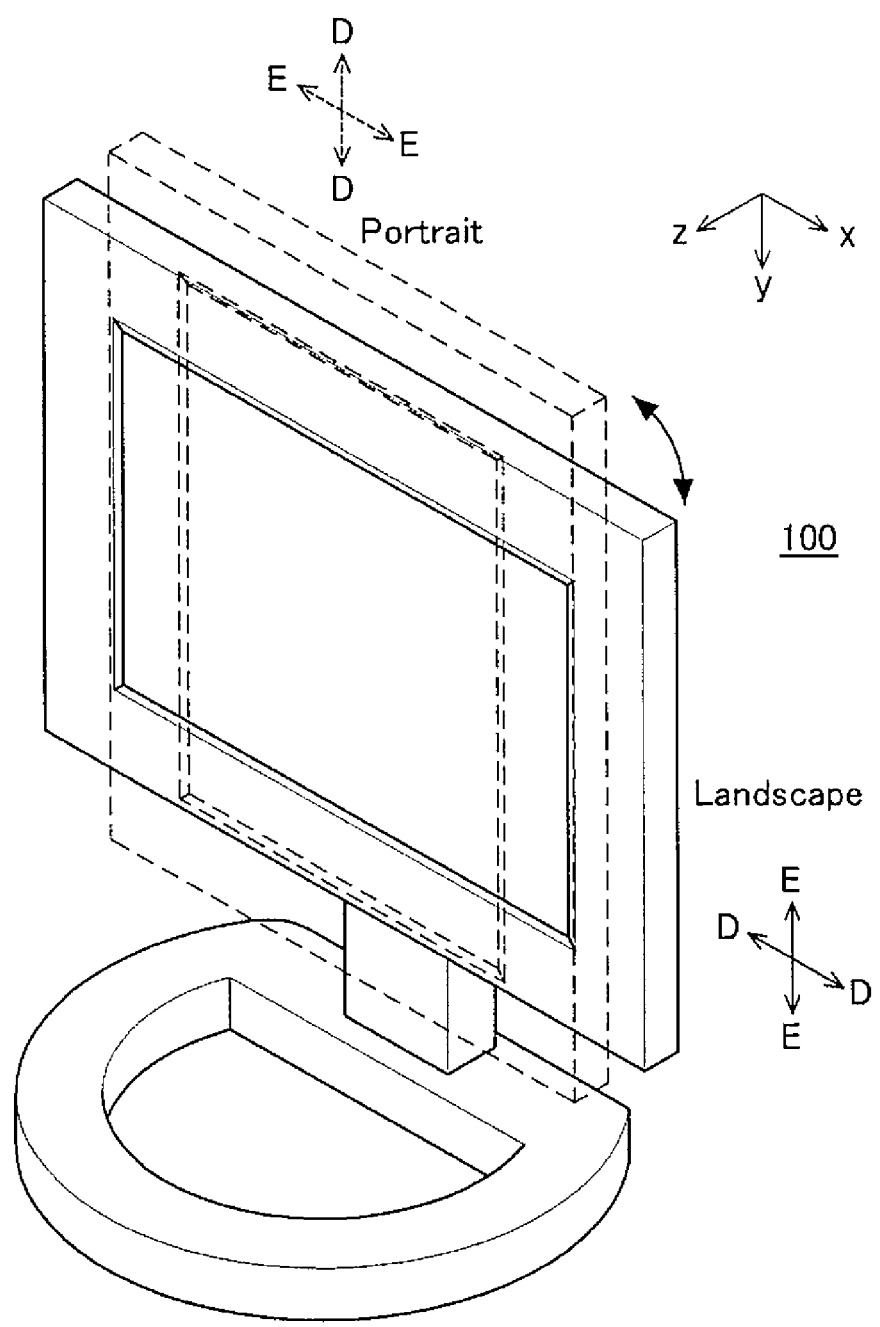
FIG. 24 is a perspective view of first and second modes of an electronic display device according to an embodiment of the present invention.

As shown in FIG. 24, the electronic display device 100 according to the present embodiment has a screen rotating function so as to selectively implement a landscape mode (hereinafter also referred to a first mode) and a portrait mode (hereinafter also referred to as a second mode).

In the first mode, the major axes (long axes) of the display unit and the liquid crystal barrier indicated by arrows D in FIG. 24 are aligned with the horizontal direction (x-axis direction) of the screen. In the second mode, the minor axes (short axes) of the display unit and the liquid crystal barrier indicated by arrows E in FIG. 24 are aligned with the horizontal direction (x-axis direction).

In both the first and second modes of the electronic display device 100, the liquid crystal barrier can reduce the viewing angle in the horizontal direction (x-axis direction) of the screen due to the later-described structure, so that the narrow viewing-angle mode in the direction can be implemented.

Figure 25:
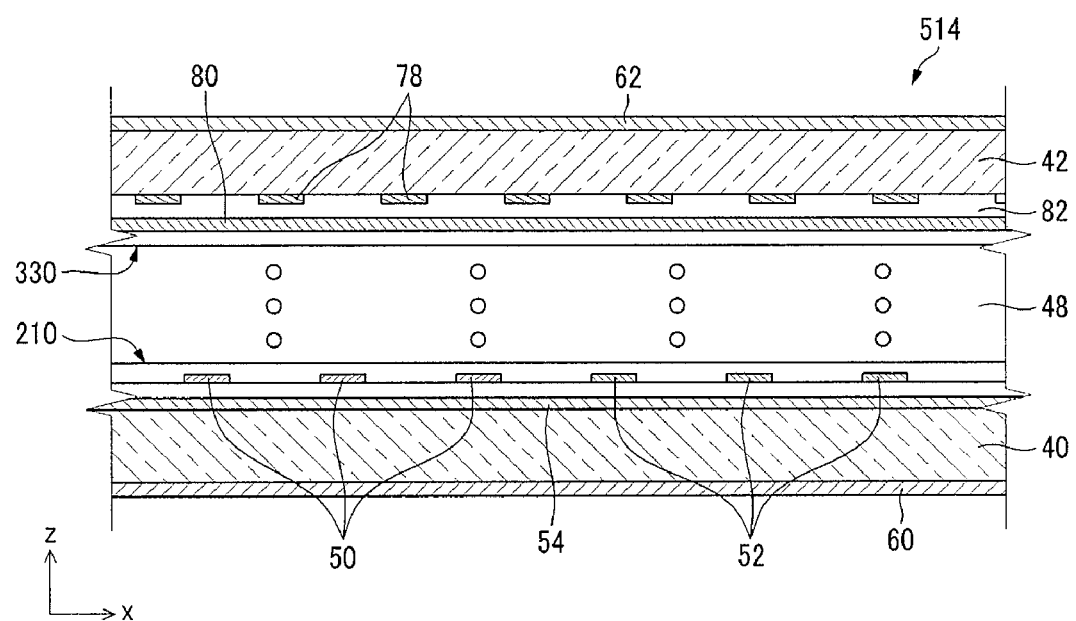
FIG. 25 is a partial cross-sectional view showing a liquid crystal barrier in the electronic display device shown in FIG. 1 according to a fifth exemplary embodiment.
Figure 26:
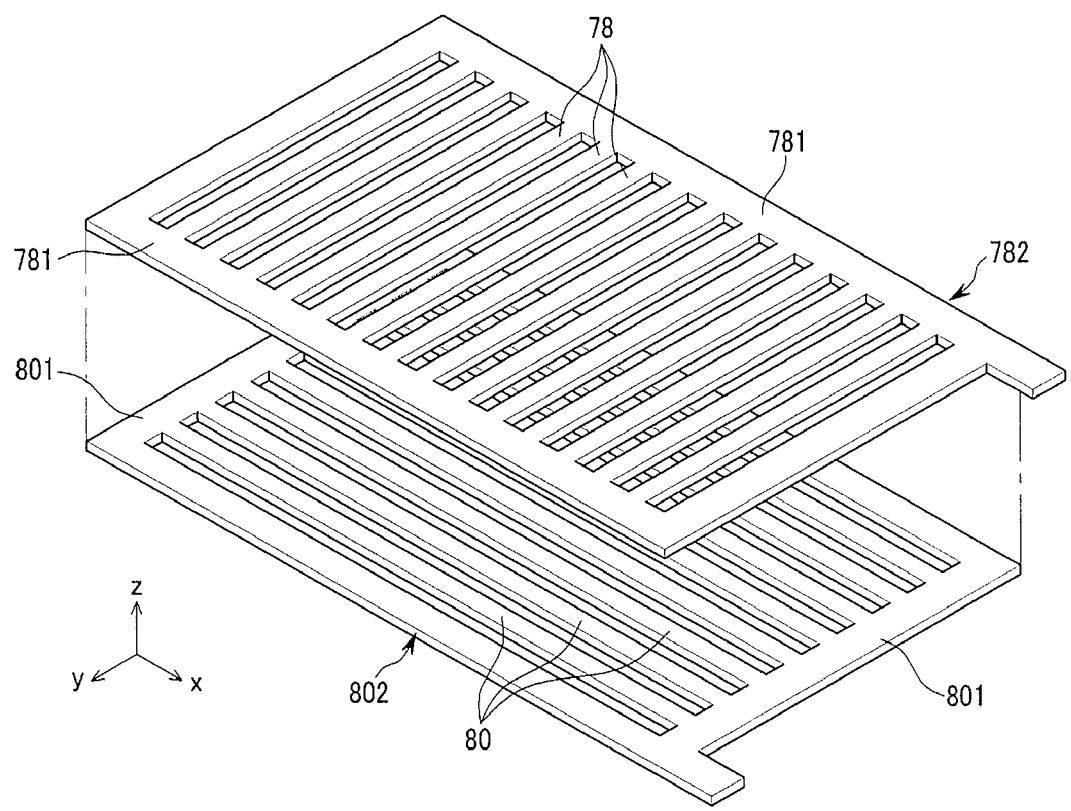
FIG. 26 is a schematic exploded perspective view showing fifth and sixth electrodes in the liquid crystal barrier shown in FIG. 25.

FIG. 25 is a partial cross-sectional view showing a liquid crystal barrier in the electronic display device shown in FIG. 1 according to a fifth exemplary embodiment, and FIG. 26 is a schematic exploded perspective view showing the fifth and sixth electrodes in the liquid crystal barrier shown in FIG. 25.

Referring to FIGS. 25 and 26, the liquid crystal barrier 514 according to the fifth exemplary embodiment includes fifth electrodes 78 and sixth electrodes 80 that are disposed to extend in directions crossing the fifth electrodes 78 at (or on) the inner surface of the second substrate 42. Other constructions except for the fifth electrodes 78 and the sixth electrodes 80 are the same (or substantially the same) as those of the aforementioned first or third exemplary embodiments. For example, in FIG. 25, the first controller 210 according to the first exemplary embodiment is shown, and the same elements as those of the first exemplary embodiment are denoted by the same reference numerals.

The fifth electrodes 78 are spaced apart from each other by an interval along the first direction (x-axis direction) of the liquid crystal barrier 514. The sixth electrodes 80 are spaced apart from each other by an interval along the second direction (y-axis direction) crossing (or perpendicular to) the first direction. The fifth electrodes 78 and the sixth electrodes 80 are disposed in different layers with the second insulating layer 82 interposed therebetween so as not to be short-circuited. In FIG. 25, the fifth electrodes 78 are disposed to be closer to the second substrate 42 than the sixth electrodes 80 are. However, the present invention is not thereby limited, and the opposite structure may be utilized.

Here, the first direction is parallel to one of the major and minor axes of the liquid crystal barrier 514. The first direction may be aligned with the horizontal direction (x-axis direction) of the screen in the main mode of the first and second modes. In FIGS. 25 to 32, it is assumed that the first mode is the main mode where the first and second directions are aligned with the major and minor axes of the liquid crystal barrier 514, respectively.

Fifth connection electrodes 781 are provided to (or coupled to) both-side ends of the fifth electrodes 78. The fifth connection electrodes 781 and the fifth electrodes 78 constitute a fifth electrode set 782. Sixth connection electrodes 801 are provided to (or coupled to) both-side ends of the sixth electrodes 80. The sixth connection electrodes 801 and the sixth electrodes 80 constitute a sixth electrode set 802. The fifth electrodes 78 and the sixth electrodes 80 constitute a second controller 330.

The liquid crystal barrier 514 according to the present exemplary embodiment can implement the wide viewing-angle mode and the stereoscopic image mode in the same operating conditions as those of the liquid crystal barrier 114 according to the first exemplary embodiment. The operation in the narrow viewing-angle mode can be implemented as follows.

Figure 27:
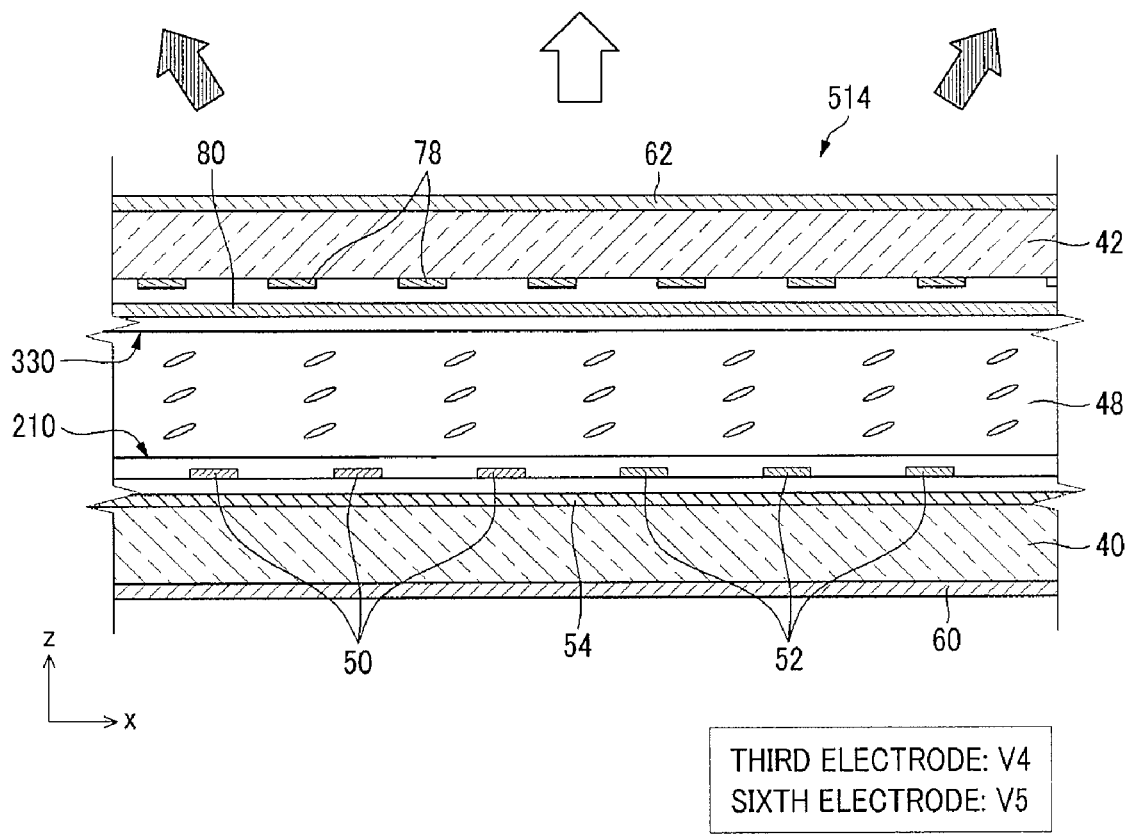
FIG. 27 is a partial cross-sectional view showing a narrow viewing-angle mode of the liquid crystal barrier shown in FIG. 25 in the first mode shown in FIG. 24.
Figure 28:
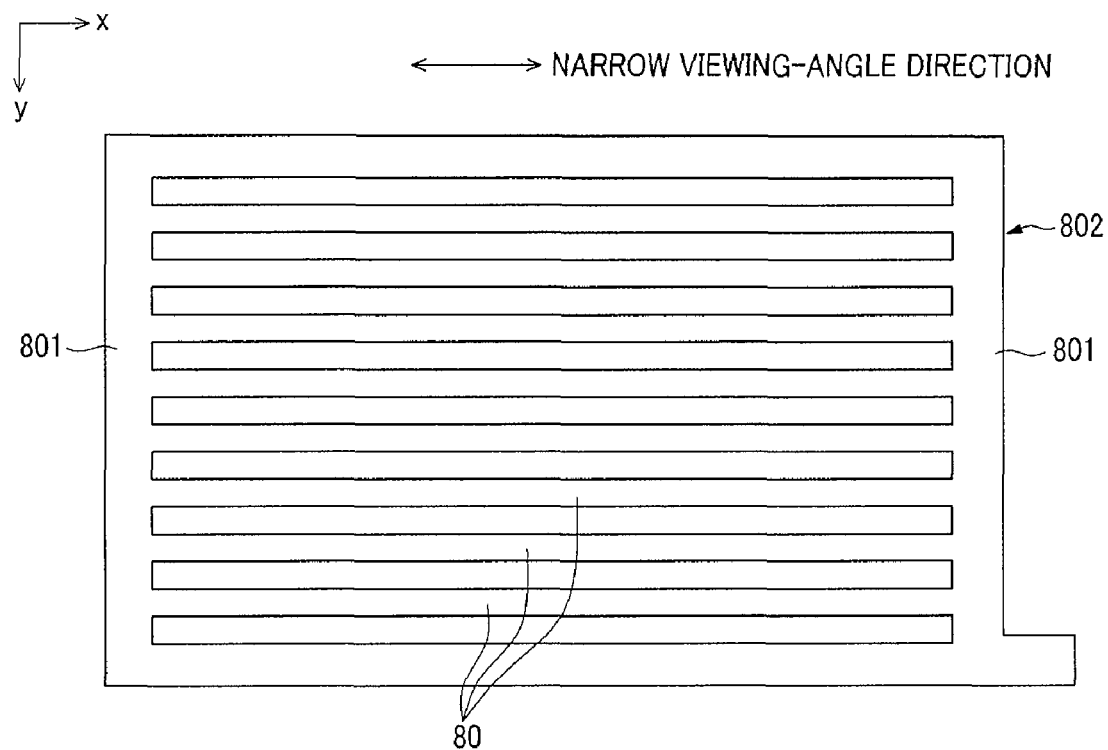
FIG. 28 is a partial plan view showing a sixth electrode set in the liquid crystal barrier shown in FIG. 25 observed in the first mode shown in FIG. 24.

FIG. 27 is a partial cross-sectional view showing the narrow viewing-angle mode of the liquid crystal barrier shown in FIG. 25 in the first mode shown in FIG. 24, and FIG. 28 is a plan view showing the sixth electrode set in the liquid crystal barrier shown in FIG. 25 observed in the first mode.

Referring to FIGS. 27 and 28, a fourth voltage V4 is applied to the third electrode 54, and a fifth voltage V5 is applied to the sixth electrodes 80. A voltage difference between the fourth and fifth voltages V4 and V5 is equal to or larger than a threshold value. Due to the voltage difference between the fourth and fifth voltages V4 and V5, a vertical electric field is generated in the liquid crystal layer 48. Therefore, the alignment directions of the liquid crystal molecules are changed, so that the liquid crystal barrier 514 becomes completely transmissive.

Here, a horizontal electric field is generated in the width direction (y-axis direction) of the sixth electrodes 80 in upper portions of the liquid crystal layer 48 between the sixth electrodes 80 under the second substrate 42, so that the viewing angle is narrowed according to the direction (x-axis direction) perpendicular to the horizontal electric field. As a result, the narrow viewing-angle direction is set to the horizontal direction (x-axis direction) of the screen in the first mode.

Figure 29:
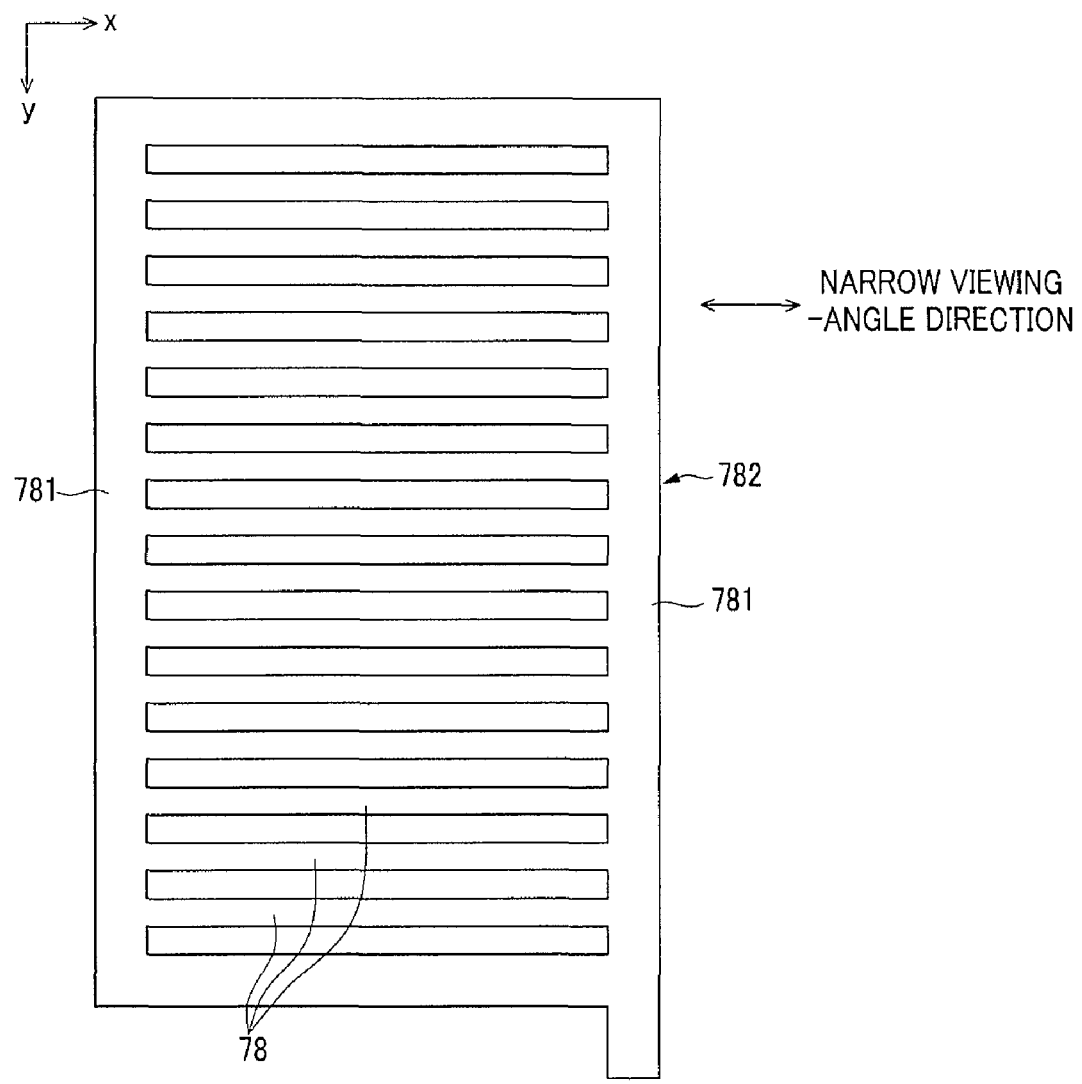
FIG. 29 is a partial plan view showing a fifth electrode set in the liquid crystal barrier shown in FIG. 25 observed in the second mode shown in FIG. 24.

FIG. 29 is a plan view showing the fifth electrode set in the liquid crystal barrier shown in FIG. 25 observed in the second mode.

Referring to FIGS. 27 and 29, a fourth voltage V4 is applied to the third electrode 54, and a fifth voltage V5 is applied to the fifth electrodes 78. A voltage difference between the fourth voltage V4 and the fifth voltage V5 is equal to or larger than a threshold value. Due to the voltage difference between the fourth and fifth voltages V4 and V5, a vertical electric field is generated in the liquid crystal layer 48. Therefore, the alignment directions of the liquid crystal molecules are changed, so that the liquid crystal barrier 514 becomes completely transmissive.

Here, a horizontal electric field is generated in the width direction (y-axis direction) of the fifth electrodes 78 in upper portions of the liquid crystal layer 48 between the fifth electrodes 78 under the second substrate 42, so that the viewing angle is narrowed according to the direction (x-axis direction) perpendicular to the horizontal electric field. As a result, in the second mode, the narrow viewing-angle direction is also set to the horizontal direction (x-axis direction) of the screen.

In the electronic display device having the liquid crystal barrier 514 according to the exemplary embodiment, the narrow viewing-angle direction can be implemented to be the horizontal direction of the screen in the second mode as well as the first mode. Since the narrow viewing-angle direction is set to the horizontal direction of the screen, the screen cannot be clearly seen by the observer who is at the left or right side position of the screen.

Figure 30:
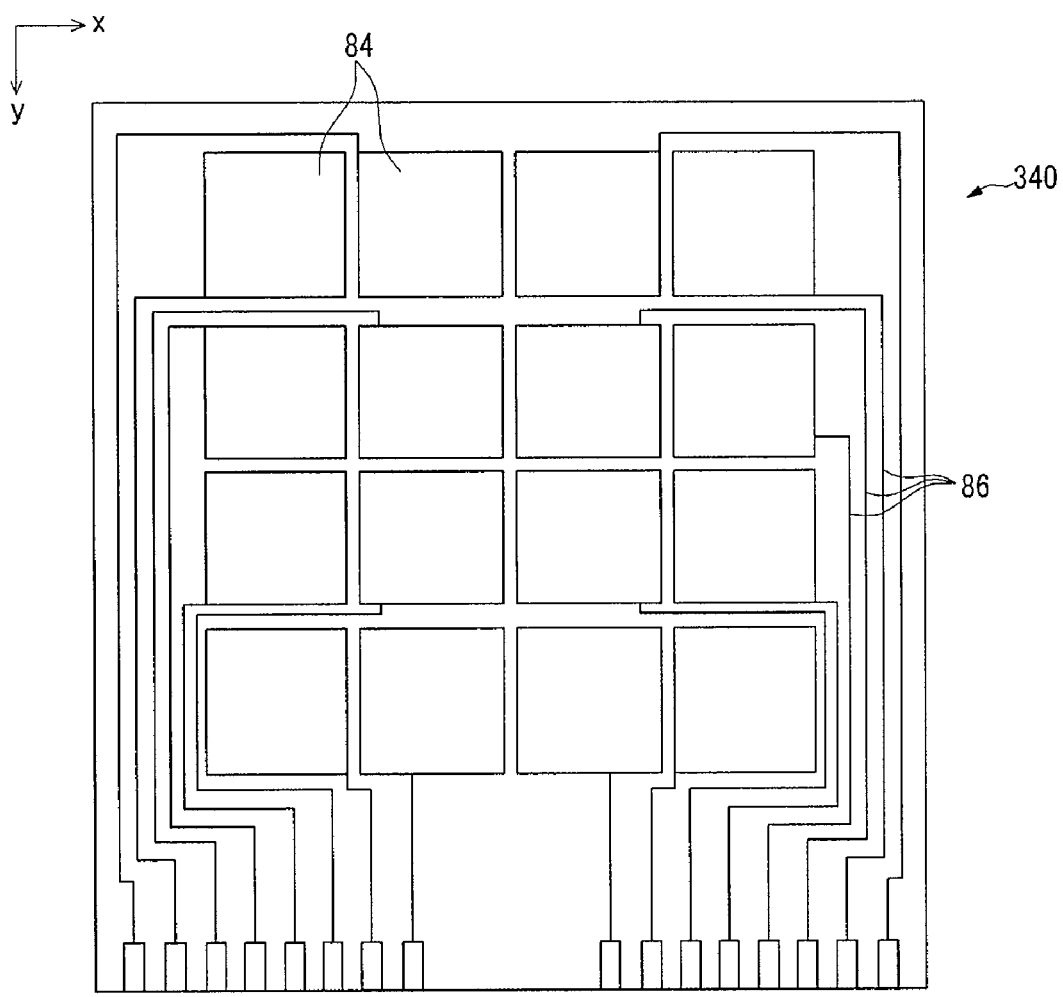
FIG. 30 is a partial plan view showing a second controller for a liquid crystal barrier in the electronic display device shown in FIG. 1 according to a sixth exemplary embodiment.

FIG. 30 is a schematic partial plan view showing a second controller for a liquid crystal barrier in the electronic display device shown in FIG. 1 according to a sixth exemplary embodiment. The liquid crystal barrier according to the sixth exemplary embodiment also includes the first controller according to the first exemplary embodiment or the first controller according to the third exemplary embodiment.

Referring to FIG. 30, in the liquid crystal barrier according to the sixth exemplary embodiment, the second controller 340 includes seventh electrodes 84 disposed in the first direction (x-axis direction) and the second direction (y-axis direction) with an interval therebetween, and wire lines 86, respectively electrically connected to the seventh electrodes 84. The seventh electrodes 84 may be formed in a quadrangle shape, and are constructed with a transparent conductive layer. The seventh electrodes 84 are disposed to be parallel to each other on (or at) the inner surface of the second substrate and covered with a second alignment layer.

Figure 31:
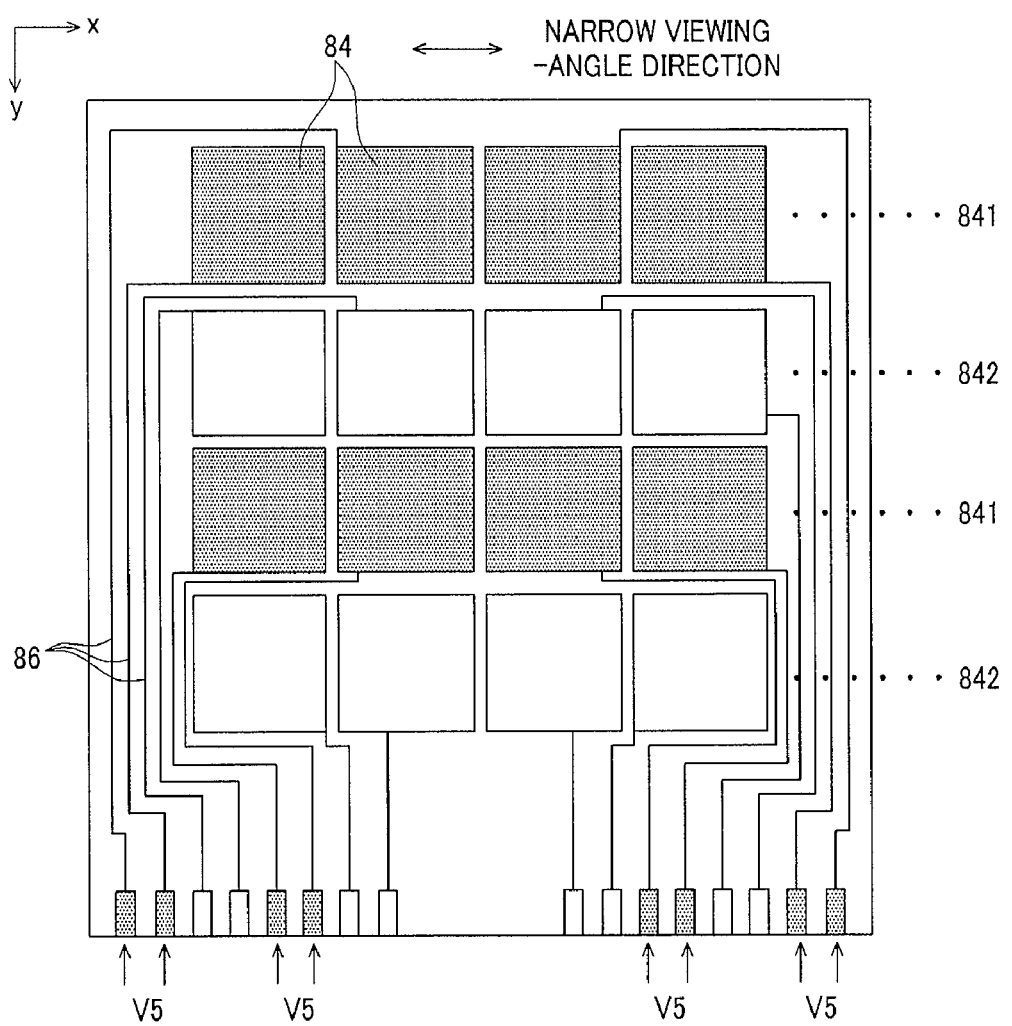
FIG. 31 is a partial plan view of seventh electrodes for explaining a narrow viewing-angle mode of the liquid crystal barrier shown in FIG. 30 in the first mode shown in FIG. 24.

FIG. 31 is a plan view of the seventh electrodes 84 for explaining the narrow viewing-angle mode of the liquid crystal barrier shown in FIG. 30 in the first mode shown in FIG. 24.

Referring to FIG. 31, a fourth voltage is applied to the third electrode disposed in the first substrate, and a fifth voltage V5 is applied to the seventh electrodes 84 of odd-numbered lines 841 or even-numbered lines 842 among the seventh electrodes 84, which are disposed to extend in the first direction (x-axis direction). A voltage difference between the fourth voltage and the fifth voltage V5 is equal to or larger than a threshold value. As an example, FIG. 31 shows a case where the fifth voltage V5 is applied to the seventh electrodes 84 of the odd-numbered lines 841.

Due to the voltage difference between the fourth and fifth voltages, a vertical electric field is generated in the liquid crystal layer. Therefore, the alignment directions of the liquid crystal molecules are changed, so that the liquid crystal barrier becomes completely transmissive. In this case, the seventh electrodes 84 of the odd-numbered line 841 function as the fifth electrodes in the aforementioned fifth exemplary embodiment, so that the narrow viewing-angle direction is set to the horizontal direction (x-axis direction) of the screen.

Figure 32:
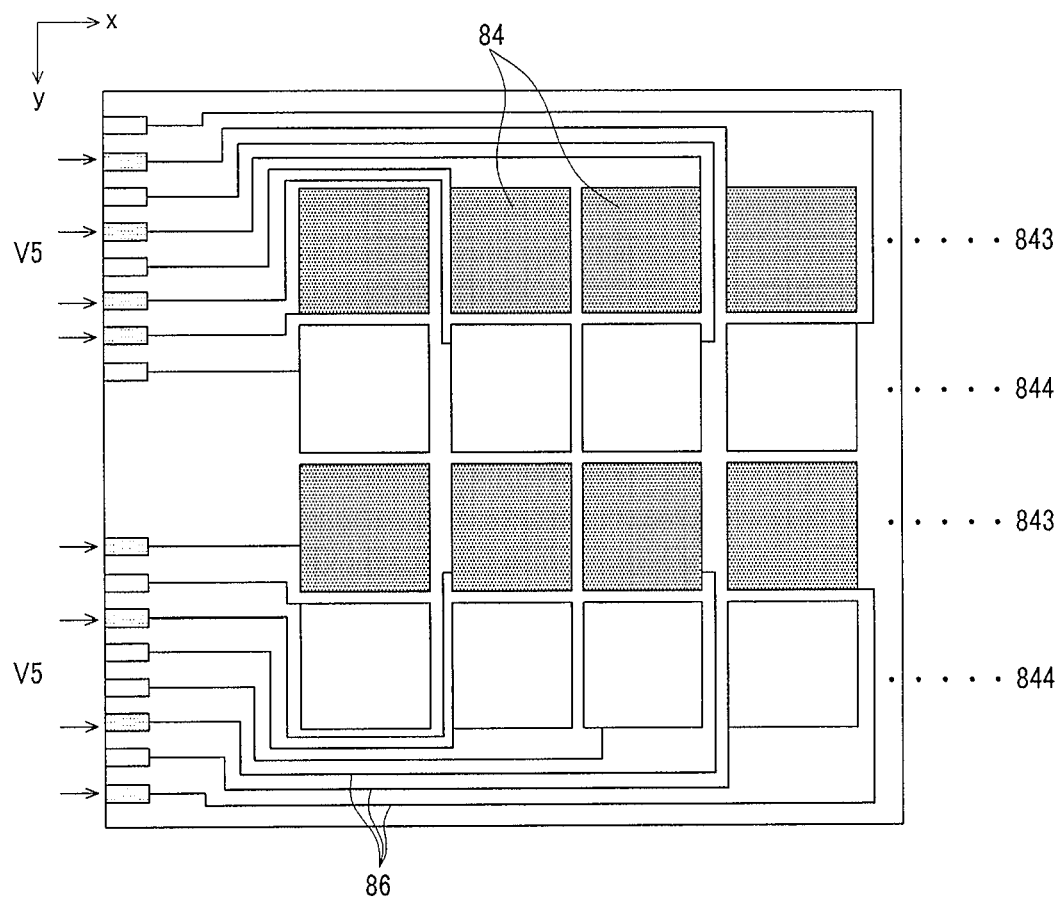
FIG. 32 is a partial plan view of the seventh electrodes for explaining the narrow viewing-angle mode of the liquid crystal barrier shown in FIG. 30 in the second mode shown in FIG. 24.

FIG. 32 is a plan view of the seventh electrodes for explaining the narrow viewing-angle mode of the liquid crystal barrier shown in FIG. 30 in the second mode shown in FIG. 24.

Referring to FIG. 32, a fourth voltage is applied to the third electrode disposed in the first substrate, and a fifth voltage V5 is applied to the seventh electrodes 84 in the odd-numbered lines 843 or the even-numbered lines 844 among the seventh electrodes 84, which are disposed to extend in the second direction (x-axis direction). A voltage difference between the fourth voltage and the fifth voltage V5 is equal to or larger than a threshold value. As an example, FIG. 32 shows a case where the fifth voltage V5 is applied to the seventh electrodes 84 of the odd-numbered lines 843.

Due to the voltage difference between the fourth and fifth voltages, a vertical electric field is generated in the liquid crystal layer. Therefore, the alignment directions of the liquid crystal molecules are changed, so that the liquid crystal barrier becomes completely transmissive. In this case, the seventh electrodes 84 of the odd-numbered lines 843 function as the fifth electrodes in the aforementioned fifth exemplary embodiment, so that the narrow viewing-angle direction is set to the horizontal direction (x-axis direction) of the screen.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electronic display device comprising:
 a display unit for displaying an image; and
 a liquid crystal barrier disposed in front of the display unit, wherein the liquid crystal barrier comprises:
  a first substrate and a second substrate facing the first substrate;
  a liquid crystal layer disposed between the first and second substrates;
  a first controller for controlling light transmission, wherein the first controller is disposed at a side of the first substrate facing the liquid crystal layer and comprises a plurality of first electrodes spaced apart from each other by an interval along a first direction of the liquid crystal barrier, a plurality of second electrodes arranged between the first electrodes along the first direction, and a third electrode insulated from the first and second electrodes; and
  a second controller for adjusting a viewing angle, wherein the second controller is disposed at a side of the second substrate facing the liquid crystal layer and comprises at least one electrode.

2. The electronic display device of claim 1, further comprising an insulating layer, wherein the third electrode is disposed over an entire active area of the first substrate, and the third electrode is disposed at a plane of the liquid crystal barrier different from that of the first electrodes and the second electrodes with the insulating layer interposed between the third electrode and the first and second electrodes.

3. The electronic display device of claim 2, wherein the third electrode is disposed to be closer to the first substrate than the first and second electrodes are disposed to the first substrate, and a thickness of the insulating layer is smaller than that of the liquid crystal layer.

4. The electronic display device of claim 2, wherein the first controller further comprises:
 a first connection electrode coupled to one-side ends of the first electrodes, so that the first connection electrode and the first electrodes constitute a first electrode set; and
 a second connection electrode coupled to one-side ends of the second electrodes, so that the second connection electrode and the second electrodes constitute a second electrode set.

5. The electronic display device of claim 2, wherein each of the first and second electrodes has an opening configured to extend in a longitudinal direction thereof.

6. The electronic display device of claim 1, wherein the third electrode is disposed at a same plane of the liquid crystal barrier as that of the first electrodes and the second electrodes and between the first electrodes and the second electrodes.

7. The electronic display device of claim 6, wherein the first controller further comprises:
a first connection electrode coupled to one-side ends of the first electrodes, so that the first connection electrode and the first electrodes constitute a first electrode set; and
a second connection electrode coupled to one-side ends of the second electrodes, so that the second connection electrode and the second electrodes constitute a second electrode set.

8. The electronic display device of claim 7, wherein each of the first electrodes has a first opening open from the second connection electrode, each of the second electrodes has a second opening open from the first connection electrode, and the third electrode includes a plurality of extensions extending into the first openings and the second openings.

9. The electronic display device of claim 1, wherein the at least one electrode of the second controller comprises a fourth electrode formed over an entire active area of the second substrate.

10. The electronic display device of claim 1, wherein the at least one electrode of the second controller comprises a plurality of fourth electrodes spaced apart from each other by an interval along the first direction.

11. The electronic display device of claim 10, wherein the at least one electrode of the second controller further comprises a plurality of fourth connection electrodes coupled to both-side ends of the fourth electrodes, so that the fourth connection electrodes and the fourth electrodes constitute a fourth electrode set.

12. The electronic display device of claim 1, wherein the at least one electrode of the second controller comprises a plurality of fourth electrodes spaced apart from each other by an interval along a second direction perpendicular to the first direction.

13. The electronic display device of claim 12, wherein the at least one electrode of the second controller further comprises a plurality of fourth connection electrodes coupled to both-side ends of the fourth electrodes, so that the fourth connection electrodes and the fourth electrodes constitute a fourth electrode set.

14. The electronic display device of claim 1, wherein the at least one electrode of the second controller comprises:
a plurality of fourth electrodes spaced apart from each other by an interval along the first direction; and
a plurality of fifth electrodes insulated from the fourth electrodes by an insulating layer and spaced apart from each other by an interval along a second direction perpendicular to the first direction.

15. The electronic display device of claim 14, wherein the at least one electrode of the second controller further comprises:
a plurality of fifth connection electrodes coupled to both-side ends of the fifth electrodes, so that the fifth connection electrodes and the fifth electrodes constitute a fifth electrode set; and
a plurality of sixth connection electrodes coupled to both-side ends of the sixth electrodes, so that the sixth connection electrodes and the sixth electrodes constitute a sixth electrode set.

16. The electronic display device of claim 1, wherein the at least one electrode of the second controller comprises:
a plurality of fourth electrodes disposed in parallel to each other to extend in the first direction and also a second direction perpendicular to the first direction with an interval therebetween; and
a plurality of wire lines electrically connected to the fourth electrodes.

17. The electronic display device of claim 1,
wherein the first direction is aligned with a horizontal direction of the display unit seen by an observer, and
wherein the display unit together with the liquid crystal barrier are adapted to selectively implement a first mode and a second mode, wherein the first mode is implemented when the display unit together with the liquid crystal barrier is maintained at a first position and the second mode is implemented when the display unit together with the liquid crystal barrier is rotated from the first position to a second position differing from the first position.

18. An electronic display device comprising:
a display unit for displaying an image; and
a liquid crystal barrier disposed in front of the display unit,
wherein the liquid crystal barrier comprises:
a first substrate and a second substrate facing the first substrate;
a liquid crystal layer disposed between the first and second substrates;
a first controller disposed at a side of the first substrate facing the liquid crystal layer and comprising a plurality of first electrodes spaced apart from each other by an interval along a first direction of the liquid crystal barrier, a plurality of second electrodes arranged between the first electrodes along the first direction, and a third electrode insulated from the first and second electrodes; and
a second controller disposed at a side of the second substrate facing the liquid crystal layer and comprising a fourth electrode,
wherein, when a first voltage is applied to the first electrodes and the second electrodes, and a second voltage is applied to the third electrode, a wide viewing-angle mode is implemented,
wherein, when the first voltage is applied to the first electrodes and the second electrodes, the second voltage is applied to the third electrode, and a third voltage is applied to the fourth electrode, a narrow viewing-angle mode is implemented, and
wherein, when the first voltage is applied to the first electrodes or the second electrodes, and the second voltage is applied to the third electrode, a stereoscopic image mode is implemented.

19. An electronic display device comprising:
a display unit for displaying an image; and
a liquid crystal barrier disposed in front of the display unit,
wherein the liquid crystal barrier comprises:
a first substrate and a second substrate facing the first substrate;
a liquid crystal layer disposed between the first and second substrates;
a first controller disposed at a side of the first substrate facing the liquid crystal layer and comprising a plurality of first electrodes spaced apart from each other by an interval along a first direction of the liquid crystal barrier, a plurality of second electrodes arranged between the first electrodes along the first direction, and a third electrode insulated from the first and second electrodes; and a second controller disposed at a side of the second substrate facing the liquid crystal layer and comprising a plurality of fourth electrodes spaced apart from each other by an interval along the first direction or a second direction perpendicular to the first direction, wherein, when a first voltage is applied to the first electrodes and the second electrodes, and a second voltage is applied to the third electrode, a wide viewing-angle mode is implemented, wherein, when the first voltage is applied to the first electrodes or the second electrodes, and the second voltage is applied to the third electrode, a stereoscopic image mode is implemented, and wherein, when a third voltage is applied to the third electrode, and a fourth voltage is applied to the fourth electrodes, a narrow viewing-angle mode is implemented.

20. An electronic display device comprising:

a display unit for displaying an image; and a liquid crystal barrier disposed in front of the display unit, wherein the liquid crystal barrier is adapted to selectively implement a first mode when the liquid crystal barrier together with the display unit is maintained at a first position and a second mode when the liquid crystal barrier together with the display unit is rotated from the first position to a second position differing from the first position, wherein the liquid crystal barrier comprises:

a first substrate and a second substrate facing the first substrate;

a liquid crystal layer disposed between the first and second substrates;

a first controller disposed at a side of the first substrate facing the liquid crystal layer and comprising a plurality of first electrodes spaced apart from each other by an interval along a first direction of the liquid crystal barrier, a plurality of second electrodes arranged between the first electrodes along the first direction, and a third electrode insulated from the first and second electrodes; and a second controller disposed at a side of the second substrate facing the liquid crystal layer and comprising a plurality of fourth electrodes spaced apart from each other by an interval along the first direction, and a plurality of fifth electrodes spaced apart from each other by an interval along a second direction perpendicular to the first direction, wherein, when a first voltage is applied to the first electrodes and the second electrodes, and a second voltage is applied to the third electrode, a wide viewing-angle mode is implemented, wherein, when the first voltage is applied to the first electrodes or the second electrodes, and the second voltage is applied to the third electrode, a stereoscopic image mode is implemented, wherein, in the first mode, a third voltage is applied to the third electrode, and a fourth voltage is applied to the fifth electrodes, so that a narrow viewing-angle mode in a horizontal direction of the display unit is implemented, and wherein, in the second mode, the third voltage is applied to the third electrode, and the fourth voltage is applied to the fourth electrodes, so that the narrow viewing-angle mode in the horizontal direction of the display unit is implemented.

21. An electronic display device comprising:

a display unit for displaying an image; and a liquid crystal barrier disposed in front of the display unit, wherein the liquid crystal barrier is adapted to selectively implement a first mode when the liquid crystal barrier together with the display unit is maintained at a first position and a second mode when the liquid crystal barrier together with the display unit is rotated from the first position to a second position differing from the first position, wherein the liquid crystal barrier comprises:

a first substrate and a second substrate facing the first substrate;

a liquid crystal layer disposed between the first and second substrates;

a first controller disposed at a side of the first substrate facing the liquid crystal layer and comprising a plurality of first electrodes spaced apart from each other by an interval along a first direction of the liquid crystal barrier, a plurality of second electrodes arranged between the first electrodes along the first direction, and a third electrode insulated from the first and second electrodes; and a second controller disposed at a side of the second substrate facing the liquid crystal layer and comprising a plurality of fourth electrodes disposed in parallel to each other to extend in the first direction and also a second direction perpendicular to the first direction with an interval therebetween, wherein, when a first voltage is applied to the first electrodes and the second electrodes, and a second voltage is applied to the third electrode, a wide viewing-angle mode is implemented, wherein, when the first voltage is applied to the first electrodes or the second electrodes, and the second voltage is applied to the third electrode, a stereoscopic image mode is implemented, wherein, in the first mode, a third voltage is applied to the third electrode, and a fourth voltage is applied to the fourth electrodes of odd-numbered lines or even-numbered lines disposed to extend in the first direction, so that a narrow viewing-angle mode in a horizontal direction of the display unit is implemented, and wherein, in the second mode, the third voltage is applied to the third electrode, and the fourth voltage is applied to the fourth electrodes of the odd-numbered lines or the even-numbered lines disposed to extend in the second direction, so that the narrow viewing-angle mode in the horizontal direction of the display unit is implemented.

* * * * *